US009733796B2

(12) United States Patent
Warner

(10) Patent No.: US 9,733,796 B2
(45) Date of Patent: Aug. 15, 2017

(54) RADIAL MENUS

(71) Applicant: Apple Inc., Cupertino, CA (US)

(72) Inventor: Peter Warner, Paris (FR)

(73) Assignee: Apple Inc., Cupertino, CA (US)

( * ) Notice: Subject to any disclaimer, the term of this patent is extended or adjusted under 35 U.S.C. 154(b) by 580 days.

(21) Appl. No.: 14/042,545

(22) Filed: Sep. 30, 2013

(65) Prior Publication Data

US 2014/0082557 A1 Mar. 20, 2014

Related U.S. Application Data

(63) Continuation of application No. 12/475,470, filed on May 29, 2009, now Pat. No. 8,549,432.

(51) Int. Cl.
*G06F 3/0482* (2013.01)
*G06F 3/0481* (2013.01)

(52) U.S. Cl.
CPC ........ *G06F 3/0482* (2013.01); *G06F 3/04817* (2013.01)

(58) Field of Classification Search
CPC ... G06F 3/4883; G06F 3/0482; G06F 3/04817
See application file for complete search history.

(56) References Cited

U.S. PATENT DOCUMENTS

| | | |
|---|---|---|
| 5,590,219 A | 12/1996 | Gourdol et al. |
| 5,596,347 A | 1/1997 | Robertson et al. |
| 5,598,183 A | 1/1997 | Robertson et al. |
| 5,642,131 A | 6/1997 | Pekelney et al. |
| 5,721,853 A | 2/1998 | Smith |
| 5,745,715 A | 4/1998 | Pickover et al. |
| 5,745,717 A * | 4/1998 | Vayda .................. G06F 3/0482 715/834 |
| 5,805,167 A | 9/1998 | Van Cruyningen |
| 5,828,360 A | 10/1998 | Anderson et al. |
| 5,883,625 A | 3/1999 | Crawford et al. |
| 5,916,178 A | 6/1999 | Noone et al. |

(Continued)

FOREIGN PATENT DOCUMENTS

| | | |
|---|---|---|
| AU | 2010254344 A1 | 12/2011 |
| CN | 1818844 A | 8/2006 |

(Continued)

OTHER PUBLICATIONS

"Australian Application Serial No. 2014200055, Subsequent Examiners Report mailed Oct. 12, 2015", 4 pgs.

(Continued)

*Primary Examiner* — Anil Bhargava
(74) *Attorney, Agent, or Firm* — Fernando & Partners, LLP

(57) ABSTRACT

Some embodiments of the invention provide several novel techniques for manipulating radial menus in graphical user interfaces of an application. In some embodiments, radial menus include multiple selectable items arranged about an internal location (e.g., a center of the radial menu). The novel radial menu techniques of some embodiments include (i) non-uniform spacing of menu items, (ii) the use of shading or highlighting within a region associated with an item to indicate the present selectability of the item, and (iii) the use of radial gestures for opening sub-menus and the subsequent display of the sub-menu.

18 Claims, 23 Drawing Sheets

(56) References Cited

U.S. PATENT DOCUMENTS

| | | | |
|---|---|---|---|
| 5,926,178 A * | 7/1999 | Kurtenbach | G06F 3/0482 715/834 |
| 5,969,708 A | 10/1999 | Walls | |
| 5,999,895 A | 12/1999 | Forest et al. | |
| 6,028,600 A | 2/2000 | Rosin et al. | |
| 6,219,056 B1 | 4/2001 | Felser et al. | |
| 6,362,842 B1 | 3/2002 | Tahara et al. | |
| 6,448,987 B1 | 9/2002 | Easty et al. | |
| 6,538,635 B1 | 3/2003 | Ringot | |
| 6,549,219 B2 * | 4/2003 | Selker | G06F 3/0482 345/902 |
| 6,883,143 B2 | 4/2005 | Driskell | |
| 7,350,158 B2 | 3/2008 | Yamaguchi et al. | |
| 7,487,467 B1 | 2/2009 | Kawahara et al. | |
| 7,516,419 B2 | 4/2009 | Petro et al. | |
| 7,634,740 B2 | 12/2009 | Enomoto et al. | |
| 7,644,372 B2 | 1/2010 | Russo | |
| 7,661,075 B2 | 2/2010 | Lahdesmaki | |
| 7,676,763 B2 | 3/2010 | Rummel | |
| 7,730,425 B2 | 6/2010 | De Los et al. | |
| 8,245,156 B2 | 8/2012 | Mouilleseaux et al. | |
| 8,347,226 B2 | 1/2013 | Windl | |
| 8,549,432 B2 | 10/2013 | Warner | |
| 8,578,294 B2 | 11/2013 | Eom et al. | |
| 2001/0019338 A1 | 9/2001 | Roth | |
| 2003/0174172 A1 | 9/2003 | Conrad et al. | |
| 2004/0196267 A1 | 10/2004 | Kawai et al. | |
| 2004/0221243 A1 * | 11/2004 | Twerdahl | G06F 3/016 715/834 |
| 2005/0044509 A1 | 2/2005 | Hunleth et al. | |
| 2005/0223339 A1 | 10/2005 | Lee | |
| 2005/0229116 A1 | 10/2005 | Endler et al. | |
| 2005/0278647 A1 | 12/2005 | Leavitt et al. | |
| 2006/0232551 A1 | 10/2006 | Matta | |
| 2006/0248475 A1 | 11/2006 | Abrahamsson | |
| 2007/0008300 A1 | 1/2007 | Yang et al. | |
| 2007/0180392 A1 * | 8/2007 | Russo | G06F 3/0482 715/765 |
| 2007/0198949 A1 * | 8/2007 | Rummel | G06F 3/0482 715/810 |
| 2007/0234223 A1 | 10/2007 | Leavitt et al. | |
| 2007/0250793 A1 | 10/2007 | Miura et al. | |
| 2007/0261001 A1 * | 11/2007 | Nagiyama | G06F 3/0482 715/810 |
| 2007/0271528 A1 * | 11/2007 | Park | G06F 3/0482 715/810 |
| 2008/0015841 A1 * | 1/2008 | Longe | G06F 3/0236 704/1 |
| 2008/0222569 A1 | 9/2008 | Champion et al. | |
| 2008/0229245 A1 | 9/2008 | Ulerich et al. | |
| 2008/0252597 A1 | 10/2008 | Heynen et al. | |
| 2009/0037813 A1 * | 2/2009 | Newman | G06F 3/04883 715/702 |
| 2009/0043195 A1 * | 2/2009 | Poland | A61B 8/00 600/437 |
| 2009/0172596 A1 | 7/2009 | Yamashita | |
| 2009/0187860 A1 * | 7/2009 | Fleck | G06F 3/0482 715/834 |
| 2009/0327955 A1 | 12/2009 | Mouilleseaux et al. | |
| 2009/0327963 A1 | 12/2009 | Mouilleseaux et al. | |
| 2009/0327964 A1 | 12/2009 | Mouilleseaux et al. | |
| 2010/0192103 A1 | 7/2010 | Cragun et al. | |
| 2010/0281430 A1 | 11/2010 | Safar | |
| 2010/0306702 A1 | 12/2010 | Warner | |
| 2012/0278762 A1 | 11/2012 | Mouilleseaux et al. | |

FOREIGN PATENT DOCUMENTS

| | | |
|---|---|---|
| CN | 102449588 A | 5/2012 |
| EP | 1585320 A2 | 10/2005 |
| EP | 2435900 A1 | 4/2012 |
| KR | 10-2007-0006477 A | 1/2007 |
| WO | WO-2009/158549 A2 | 12/2009 |
| WO | WO-2010/138360 A1 | 12/2010 |

OTHER PUBLICATIONS

"Chinese Application Serial No. 201080023455.5, Notice of Reexamination mailed Oct. 10, 2014", (w/ English Translation), 37 pgs.

"European Application Serial No. 10720701.1, Decision to Refuse mailed Jun. 6, 2014", 17 pgs.

"International Application Serial No. PCT/US2010/035472, Letter Requesting Amendment filed Jan. 5, 2011 in Response to International Search Report mailed Nov. 9, 2010", 6 pgs.

"European Application Serial No. 10720701.1, Summons to Attend Oral Proceedings mailed Feb. 7, 2014", 7 pgs.

"European Application Serial No. 10720701.1, Written Submissions filed Apr. 17, 2014 in response to Summons mailed Feb. 7, 2014", 14 pgs.

"Australian Application Serial No. 2014200055,First Examiner's Report mailed Apr. 2, 2015", 3 pgs.

"U.S. Appl. No. 12/164,032, 312 Amendment filed Jun. 25, 2012", 10 pgs.

"U.S. Appl. No. 12/164,032, Examiner Interview Summary mailed Jan. 23, 2012", 3 pgs.

"U.S. Appl. No. 12/164,032, Final Office Action mailed Nov. 8, 2011", 16 pgs.

"U.S. Appl. No. 12/164,032, Non Final Office Action mailed May 13, 2011", 13 pgs.

"U.S. Appl. No. 12/164,032, Notice of Allowance mailed Mar. 29, 2012", 15 pgs.

"U.S. Appl. No. 12/164,032, Preliminary Amendment filed Mar. 20, 2009", 3 pgs.

"U.S. Appl. No. 12/164,032, PTO Response to 312 Amendment mailed Jul. 13, 2012", 2 pgs.

"U.S. Appl. No. 12/164,032, Response filed Feb. 8, 2012 to Final Office Action mailed Nov. 8, 2011", 15 pgs.

"U.S. Appl. No. 12/164,032, Response filed Aug. 15, 2011 to Non Final Office Action mailed May 13, 2011", 15 pgs.

"U.S. Appl. No. 12/164,033, Advisory Action mailed Jan. 15, 2013", 2 pgs.

"U.S. Appl. No. 12/164,033, Final Office Action mailed Oct. 25, 2012", 15 pgs.

"U.S. Appl. No. 12/164,033, Non Final Office Action mailed Jan. 5, 2012", 13 pgs.

"U.S. Appl. No. 12/164,033, Non Final Office Action mailed Apr. 17, 2012", 13 pgs.

"U.S. Appl. No. 12/164,033, Non Final Office Action mailed Aug. 15, 2013", 13 pgs.

"U.S. Appl. No. 12/164,033, Preliminary Amendment filed Mar. 20, 2009", 3 pgs.

"U.S. Appl. No. 12/164,033, Response filed Jul. 17, 2012 to Non Final Office Action mailed Apr. 17, 2012", 14 pgs.

"U.S. Appl. No. 12/164,033, Response filed Sep. 26, 2011 to Restriction Requirement mailed Sep. 2, 2011", 9 pgs.

"U.S. Appl. No. 12/164,033, Response filed Dec. 26, 2012 to Final Office Action mailed Oct. 25, 2012", 13 pgs.

"U.S. Appl. No. 12/164,033, Restriction Requirement mailed Sep. 2, 2011", 7 pgs.

"U.S. Appl. No. 12/164,035, Examiner Interview Summary mailed Sep. 28, 2011", 3 pgs.

"U.S. Appl. No. 12/164,035, Examiner Interview Summary mailed May 16, 2012", 3 pgs.

"U.S. Appl. No. 12/164,035, Final Office Action mailed Feb. 10, 2012", 15 pgs.

"U.S. Appl. No. 12/164,035, Non Final Office Action mailed Apr. 2, 2013", 16 pgs.

"U.S. Appl. No. 12/164,035, Non Final Office Action mailed Oct. 31, 2011", 9 pgs.

"U.S. Appl. No. 12/164,035, Preliminary Amendment filed Mar. 20, 2009", 3 pgs.

"U.S. Appl. No. 12/164,035, Response filed Jan. 31, 2012 to Non Final Office Action mailed Oct. 31, 2011", 13 pgs.

"U.S. Appl. No. 12/164,035, Response filed May 10, 2012 to Final Office Action mailed Feb. 10, 2012", 16 pgs.

"U.S. Appl. No. 12/164,035, Response filed Oct. 3, 2011 to Restriction Requirement Sep. 2, 2011", 7 pgs.

(56) References Cited

OTHER PUBLICATIONS

"U.S. Appl. No. 12/164,035, Restriction Requirement mailed Sep. 2, 2011", 6 pgs.
"U.S. Appl. No. 12/475,470, Applicant's Summary of Examiner Interview filed Jan. 26, 2012", 2 pgs.
"U.S. Appl. No. 12/475,470, Decision on Pre-Appeal Brief Request mailed Feb. 10, 2012", 2 pgs.
"U.S. Appl. No. 12/475,470, Examiner Interview Summary mailed Dec. 22, 2011", 3 pgs.
"U.S. Appl. No. 12/475,470, Final Office Action mailed Oct. 26, 2011", 32 pgs.
"U.S. Appl. No. 12/475,470, Non Final Office Action mailed May 4, 2011", 21 pgs.
"U.S. Appl. No. 12/475,470, Non Final Office Action mailed May 31, 2012", 28 pgs.
"U.S. Appl. No. 12/475,470, Non Final Office Action mailed Dec. 7, 2012", 28 pgs.
"U.S. Appl. No. 12/475,470, Notice of Allowance mailed May 30, 2013", 11 pgs.
"U.S. Appl. No. 12/475,470, Preliminary Amendment filed Sep. 9, 2009", 4 pgs.
"U.S. Appl. No. 12/475,470, Response Filed Mar. 7, 2013 to Non-Final Office Action mailed Dec. 7, 2012", 16 pgs.
"U.S. Appl. No. 12/475,470, Response filed Aug. 2, 2012 to Non Final Office Action mailed May 31, 2012", 24 pgs.
"U.S. Appl. No. 12/475,470, Response filed Aug. 4, 2011 to Non Final Office Action mailed May 4, 2011", 18 pgs.
"Australian Application Serial No. 2010254344, Response filed Jul. 10, 2013 to First Examiner Report mailed Nov. 28, 2012", 16 pgs.
"Australian Application Serial No. 2010254344, Subsequent Examiners Report mailed Jul. 18, 2013", 3 pgs.
"Australian Serial No. 2010254344, First Examiner Report mailed Nov. 28, 2012", 3 pgs.
"Chinese Application Serial No. 201080023455.5, Office Action mailed Apr. 17, 2013", (w/ English Translation), 17 pgs.
"Chinese Application Serial No. 201080023455.5, Response filed Aug. 27, 2013 to Office Action mailed Apr. 17, 2013", 25 pgs.
"European Application Serial No. 10720701.1, Examination Notification Art. 94(3) mailed May 8, 2013", 4 pgs.
"European Application Serial No. 10720701.1, Examination Notification Art. 94(3) mailed Sep. 16, 2013", 4 pgs.
"European Application Serial No. 10720701.1, Non Final Office Action mailed May 1, 2012", 2 pgs.
"European Application Serial No. 10720701.1, Non Final Office Action mailed Jul. 3, 2012", 1 pg.
"European Application Serial No. 10720701.1, Office Action mailed Jan. 5, 2012", 2 pgs.
"European Application Serial No. 10720701.1, Response filed Jul. 2, 2012 to Office Action mailed Jan. 5, 2012", 4 pgs.
"International Application Serial No. PCT/US2009/048732, International Preliminary Report on Patentability mailed Jan. 11, 2011", 13 pgs.
"International Application Serial No. PCT/US2009/048732, International Search Report and Written Opinion mailed Dec. 27, 2010", 19 pgs.
"International Application Serial No. PCT/US2010/035472, International Preliminary Report on Patentability and Written Opinion mailed Nov. 29, 2011", 9 pgs.
"International Application Serial No. PCT/US2010/035472, International Search Report and Written Opinion mailed Nov. 9, 2010", 17 pgs.
"International Application Serial No. PCT/US2010/035472, Letter filed Jan. 5, 2011 Requesting Amendment Under Article 19", 7 pgs.
"Korean Application Serial No. 10-2011-7028354, Office Action mailed May 27, 2013", (w/ English Translation), 8 pgs.
"Korean Application Serial No. 10-2011-7028354, Voluntary Amendment filed Nov. 28, 2011", 14 pgs.
"Mobile/UI/Designs/ITouchScreen/Propsal5", mozilla wiki, [online] Retrieved from the internet: <https://wiki.mozilla.org/Mobile/UI/Designs/TouchScreen/Proposal5>, (Mar. 23, 2008), 8 pgs.
Mouilleseaux, J. P. M., "Moving Radial Menus", U.S. Appl. No. 12/164,033, filed Jun. 28, 2008, 91 pgs.
Mouilleseaux, J. P. M. et al., "Radial Menu Selection", U.S. Appl. No. 13/544,919, filed Jul. 9, 2012.
Mouilleseaux, J.-P. M. et al., "Radial Menu Selection", U.S. Appl. No. 12/164,032, filed Jun. 28, 2008, 89 pgs.
Mouilleseaux, J.-P. M., et al., "Selecting Menu Items", U.S. Appl. No. 12/164,035, filed Jun. 28, 2008, 89 pgs.
Nicholls, STU, "A circular Menu with submenus", stu nicholls—cssplay.co.uk, [online] Retrieved From Internet: <http://www.cssplay.co.uk/menus/circular-sub.html>, (Nov. 19, 2008), 6 pgs.
"Australian Application Serial No. 2010254344, Notice of Acceptance mailed Sep. 25, 2013", 2 pgs.
"Australian Application Serial No. 2010254344, Response filed Sep. 13, 2013 to Second Examiners Report mailed Jul. 18, 2013", 3 pgs.
"Chinese Application Serial No. 201080023455.5, Office Action mailed Oct. 12, 2013", (w/ English Translation), 30 pgs.
"Chinese Application Serial No. 201080023455.5, Response filed Dec. 19, 2013 to Office Action mailed Oct. 12, 2013", (w/English Translation of Pending Claims), 17 pgs.
"European Application Serial No. 10720701.1, Response filed Jan. 15, 2014 to Office Action mailed Sep. 16, 2013", 5 pgs.
"European Application Serial No. 10720701.1, Response filed Sep. 3, 2013 to Office Action mailed May 8, 2013", 9 pgs.
"Korean Application Serial No. 10-2011-7028354, Response filed Aug. 27, 2013 to Office Action mailed May 27, 2013", (w/ English Translation of Claims), 37 pgs.
"U.S. Appl. No. 13/544,919, Non Final Office Action mailed Feb. 2, 2016", 11 pgs.
"U.S. Appl. No. 13/544,919, Preliminary Amendment filed Jul. 9, 2012", 9 pgs.
"Australian Application Serial No. 2014200055, Subsequent Examiners Report mailed Apr. 5, 2016", 3 pgs.
"Australian Application Serial No. 2014200055, Response filed Feb. 17, 2016 to Subsequent Examiners Report mailed Oct. 12, 2015", 20 pgs.
"Australian Application Serial No. 2014200055, Response filed Mar. 8, 2016 to Subsequent Examiners Report mailed Feb. 25, 2016", 16 pgs.
"Australian Application Serial No. 2014200055, Response filed Mar. 24, 2016 to Subsequent Examiners Report mailed Mar. 15, 2016", W/ English Translation, 19 pgs.
"Australian Application Serial No. 2014200055, Subsequent Examiners Report mailed Feb. 25, 2016", 3 pgs.
"Australian Application Serial No. 2014200055, Subsequent Examiners Report mailed Mar. 15, 2016", 4 pgs.

\* cited by examiner

RADIAL MENUS

CLAIM OF PRIORITY

This patent application claims the benefit of priority of U.S. patent application Ser. No. 12/475,470, filed on May 29, 2009, now issued as U.S. Pat. No. 8,549,432, which is hereby incorporated by reference herein in its entirety.

FIELD OF THE INVENTION

The invention is directed towards the presentation of menu or toolbar options in a graphical user interface. Specifically, the invention is directed towards presenting these options in a radial form.

BACKGROUND OF THE INVENTION

User interfaces of computer applications often provide numerous commands or user interface tools for a user to choose from. For instance, many applications include drop-down menus. Such menus often include lists of commands. There are standard commands such as opening a file, printing a document, saving a document, etc., as well as more application-specific commands such as inserting a page break (for a word-processing application), formatting cells (for a spreadsheet application), etc.

Such drop-down menus are often located at the top of a window in which an application is running. Accessing drop-down menus via a cursor controller involves moving a cursor to the top of the window with the cursor control device, then moving along to the appropriate top level menu item, selecting a submenu (if necessary), etc. Using a cursor to select items on a linear pull-down menu requires a user to move the cursor by a particular distance down the menu to reach the desired menu item. This can require moving a cursor through a considerable distance and with considerable precision required to reach the desired menu item without going past it.

Radial menus can provide desired menu selections without the difficulties inherent in drop-down menus. However, there is minimal use as of yet of radial menus in popular computing applications. Accordingly, there is a need for radial menus with improved features that will make such menus more desirable for users.

SUMMARY OF THE INVENTION

Some embodiments of the invention provide several novel techniques for manipulating radial menus in graphical user interfaces of an application. In some embodiments, radial menus include multiple selectable items arranged about an internal location (e.g., a center of the radial menu). The novel radial menu techniques of some embodiments include (i) non-uniform spacing of menu items, (ii) the use of shading or highlighting within a region associated with an item to indicate the present selectability of the item, and (iii) the use of radial gestures for opening sub-menus and the subsequent display of the sub-menu.

As non-uniform arrangement of the selectable items about the internal location is based on priorities assigned to the different selectable items in some embodiments. Specifically, some embodiments vary the distance between the menu items such that items with a higher priority are further from their neighboring items than those with a lower priority. Some embodiments assign a range of angles to each menu item. A user moving a cursor or touching a touch-screen within an angular region defined by the range of angles and then providing selection input will select the menu item. Some such embodiments assign a larger range of angles to higher priority items than to lower priority items. Various criteria may be used to determine the priorities of the different menu items, such as the frequency of selection or expected frequency of selection of the menu items.

Some embodiments display a highlight over a selectable region for a menu item when the menu item is presently selectable. In some embodiments, the menu item is displayed as a distinct icon and the highlighted region is larger than the displayed icon. The highlight, in some embodiments, is displayed as though a light is emanating from the center of the radial menu towards the displayed menu item. The area covered by this highlight is the angular area defined by the range of angles assigned to the particular menu item, or a portion of that angular area extending a particular radial distance, in some embodiments. The area for a particular item is highlighted when the cursor is over the area in some embodiments, as a user could select the item in that case by clicking a mouse button, tapping a touchpad, etc.

In addition to mouse clicks or equivalent input, some embodiments enable gestural selection of menu items. A gestural selection, in some embodiments, is a rapid movement of the cursor in a particular direction. Gestural selections, like click selections, cause a selection of a particular menu item from the radial menu. The angle of the gesture, in some embodiments, determines the menu item selected. When the menu item selected opens a sub-menu, some embodiments wait until further input is received and display the sub-menu as a radial menu with a central location at the location of the cursor. This enables subsequent rapid sweep gestures.

In some embodiments, the cursor referred to in the description above is an icon (e.g., an arrow) that is displayed on a screen. The icon is controlled by a user via a cursor control device (e.g., a mouse, trackpad, etc.) that the user interacts with in order to move the icon on the screen. The user also interacts with the cursor control device in order to generate other inputs such as selections (e.g., by clicking or double-clicking a mouse button). In other embodiments, however, the cursor is not displayed and is defined as a location at which a user is touching the screen (i.e., when the radial menu is displayed on a touchscreen). Thus, the cursor moves as a user's finger (or other object touching the touchscreen) moves, though no icon is actually displayed.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION OF THE INVENTION

In the following description, numerous details are set forth for purpose of explanation. However, one of ordinary skill in the art will realize that the invention may be practiced without the use of these specific details. For instance, some portions of the application refer to examples that receive input from a mouse. One of ordinary skill will recognize that similar input could be received from other cursor controllers or even touchscreens without cursors as well.

Some embodiments of the invention provide several novel techniques for manipulating radial menus in graphical user interfaces (GUIs) of an application of a device. In some embodiments, radial menus include multiple selectable items arranged about an internal location (e.g., arranged completely or partially curvilinearly about the internal location of the radial menu). The GUI in which the radial menus are presented may be a GUI of an operating system, an application that runs on top of an operating system, a stand-alone application, etc., on a device (e.g., a computer, handheld device, etc.). The novel radial menu techniques of some embodiments include (i) non-uniform spacing of menu items, (ii) the use of shading or highlighting within a region associated with an item to indicate the present selectability of the item, and (iii) the use of radial gestures for opening sub-menus and the subsequent display of the sub-menu.

Figure 1:
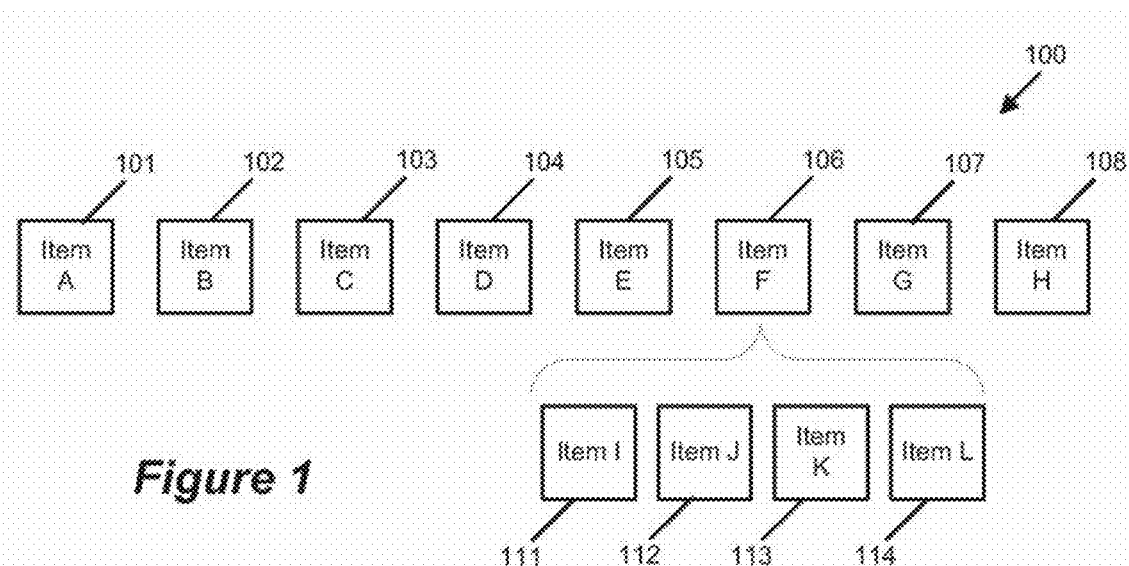
FIG. 1 conceptually illustrates a possible set of selectable menu items.

Several high-level examples of these features will be described below by reference to FIGS. 2-5. These examples will be described by reference to one possible set of selectable menu items 100 that are conceptually illustrated in FIG. 1. FIG. 1 illustrates eight primary menu items Item A-H (101-108). Each of the eight primary menu items is associated with a command that (i) performs instructions (e.g., save a file, copy text, etc.), (ii) activates a tool (e.g., a video editing tool, drawing tool, etc.), or (iii) opens a sub-menu. Item F (106) is an example of a menu item the selection of which opens a sub-menu with four items 111-114.

Figure 2:
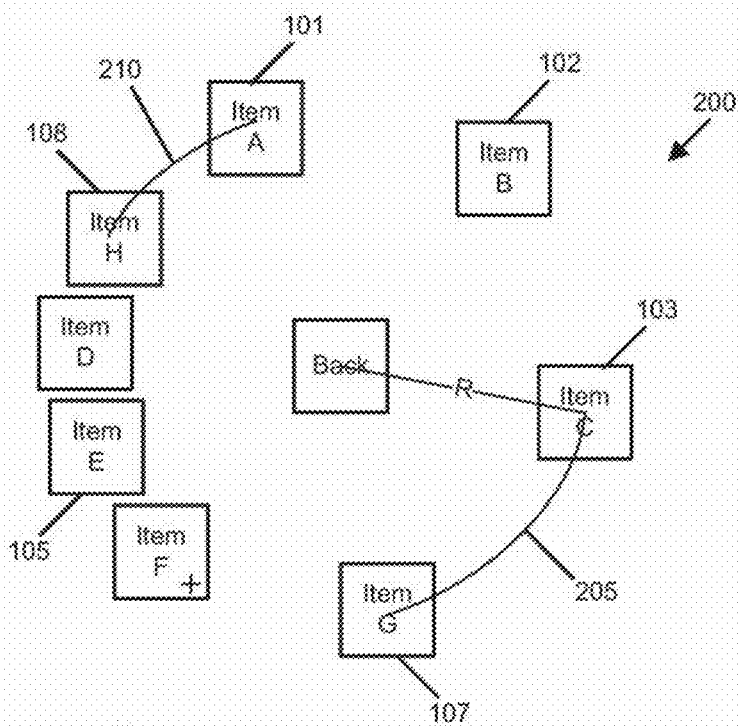
FIG. 2 illustrates a radial menu having the eight selectable menu items of FIG. 1.

FIG. 2 illustrates a radial menu 200 having the eight selectable menu items 101-108. These menu items are displayed in the radial menu as distinct icons, all of which are at a radial distance R from the central location of the menu. In radial menu 200, the menu items are displayed at unequal distances from each other. For instance, the distance 205 between Item C (103) and Item G (107) is significantly larger than the distance 210 between Item H (108) and Item A (101).

In some embodiments, the variation in distance between different menu items is based on priorities assigned to the menu items. Specifically, some embodiments vary the distance between the menu items such that the menu items with higher priorities are further from neighboring menu items than those with lower priorities. In some embodiments, each menu item in the radial menu is assigned a particular range of angles, and the displayed icon is located halfway between the bounds of its particular range. The higher a particular menu item's priority, the larger the range of angles assigned to the particular menu item. For instance, Item B (102) has a higher priority than Item E (105), and thus is assigned a larger range of angles in radial menu 200.

Various criteria may be used to determine the priorities for the different menu items. For instance, some embodiments use the frequency with which a menu item is selected to assign the priorities of the menu items. The more regularly selected menu items will have higher priorities and will thus be assigned larger angular areas and be displayed further apart. As a result of using the selection frequencies to determine priorities, the priorities may change over time, and thus the display of the radial menu will change.

Figure 3:
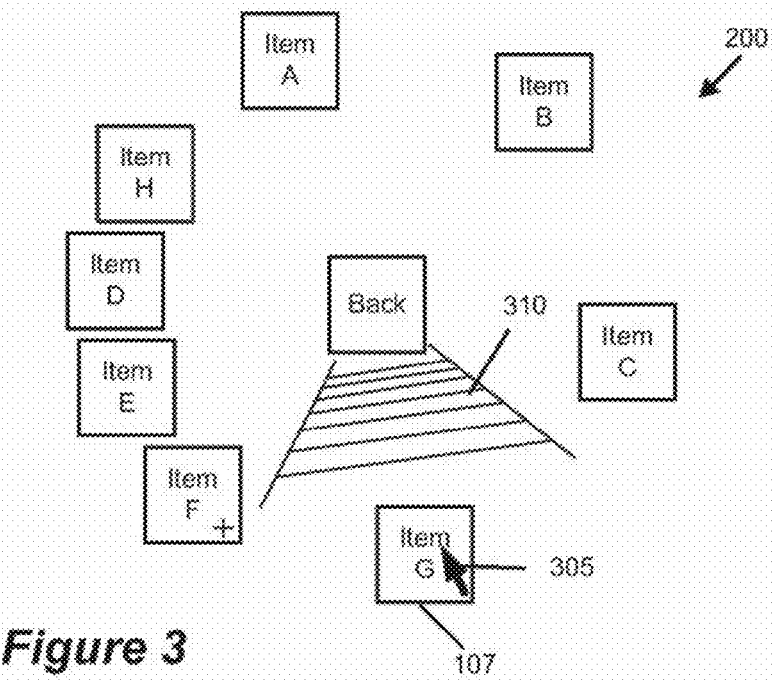
FIGS. 3 and 4 illustrate examples of highlights for different menu items of the radial menu of FIG. 2.
Figure 4:
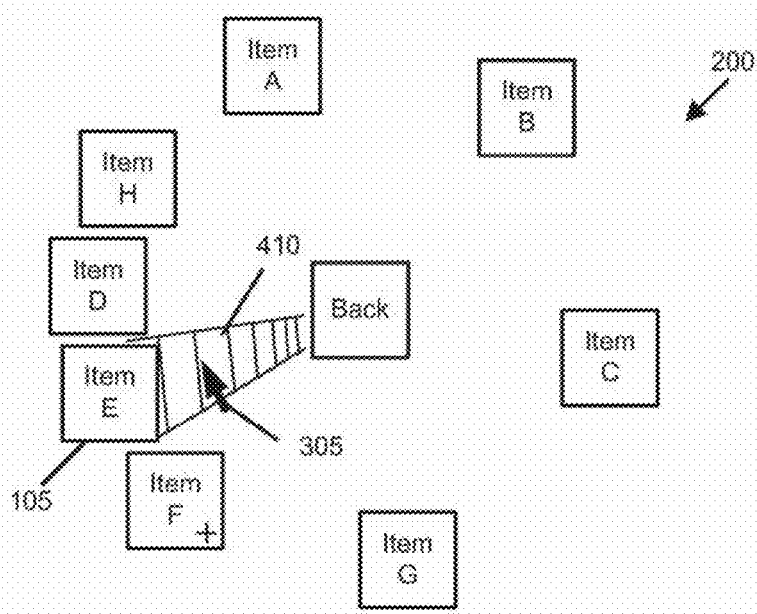

Although the menu items are displayed as distinct icons, some embodiments display a highlight over a selectable area for a menu item that is larger than the displayed icon when the menu item is presently selectable. In some embodiments, a particular menu item is presently selectable when the cursor is located over the particular menu item. FIGS. 3 and 4 illustrate examples of such highlights for different menu items of radial menu 200. FIG. 3 illustrates a cursor 305 located over the displayed icon for Item G (107). Because the cursor is located over Item G (107), this item is presently selectable and is thus highlighted. That is, the user could click a mouse button, tap a touchpad, etc. and select Item G (107) with the cursor in its present location. The highlight 310 indicates the range of angles assigned to Item G (107), with the displayed icon located in the middle of the angular range. In some embodiments, the highlight is displayed as a light emanating from the center of the radial menu, illuminating the presently selectable menu item.

FIG. 4 illustrates radial menu 200 with the cursor 305 located within the angular area assigned to Item E (105). Although the cursor is not actually over the displayed icon, the menu item is nevertheless highlighted by highlight 410. In some embodiments, a user can select a menu item from a radial menu by clicking anywhere within the angular area assigned to that menu item. Thus, although cursor 305 is not located over the displayed icon for menu item 105, if the user clicks a mouse button or provides equivalent selection input, Item E (105) will be selected. In some embodiments, this angular area extends outward to infinity, such that the cursor need not be near the radial menu for the user to select a menu item.

Figure 5:
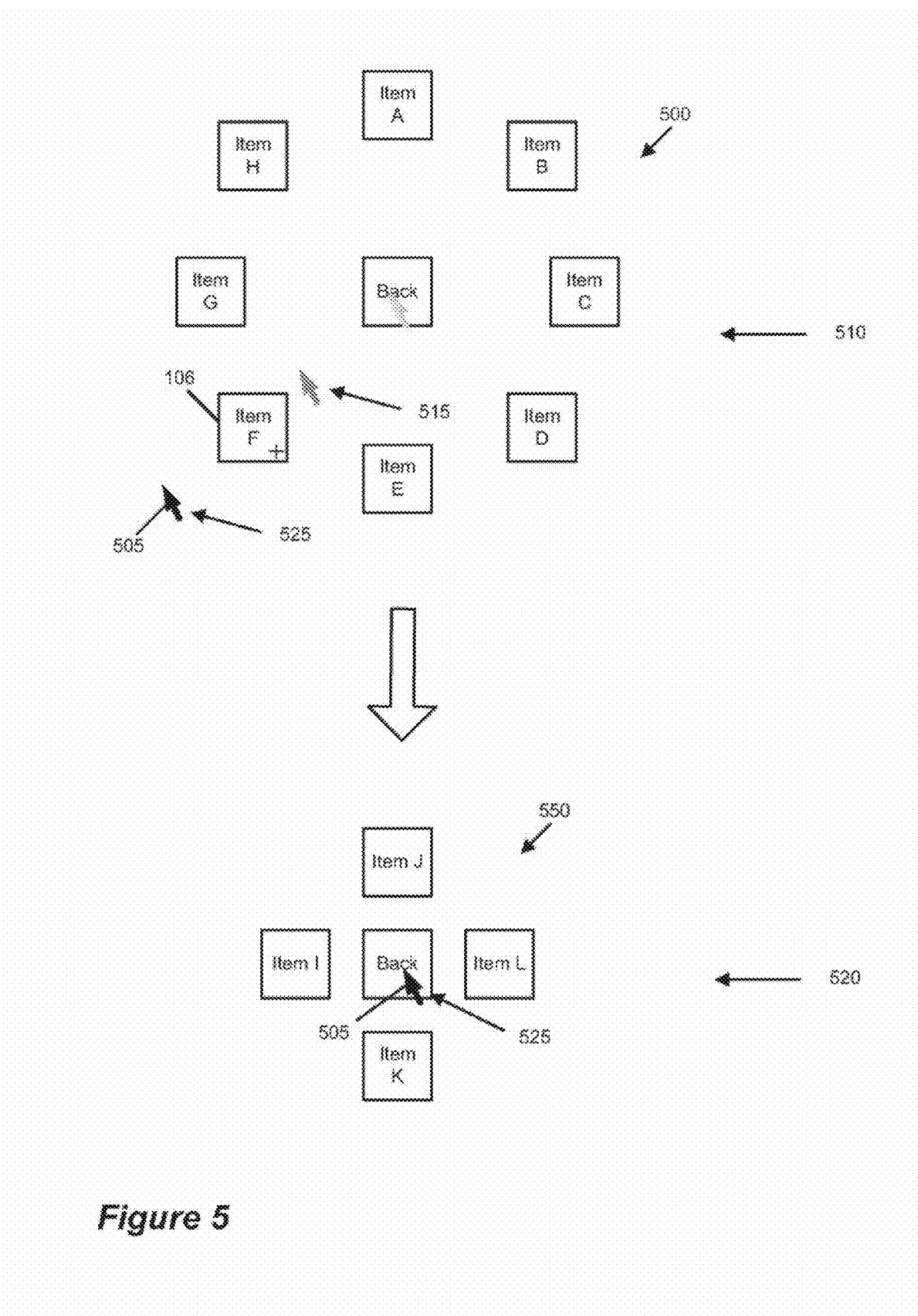
FIG. 5 illustrates a gestural selection of a menu item of a radial menu that opens a submenu.

In addition to mouse clicks or equivalent input, some embodiments allow gestural selection of menu items as well. A gestural selection, in some embodiments, is a rapid movement of the cursor in a particular direction. Like click selections, gestural selections cause selection of a particular menu item from the radial menu. FIG. 5 illustrates a gestural selection of menu item 106, which opens a sub-menu, from a radial menu 500 that also includes menu items 101-108. FIG. 5 illustrates two stages, a first stage 510 illustrating the gestural selection, and a second stage 520 illustrating the opening of a sub-menu 550.

Stage 510 illustrates radial menu 500. The eight menu items are all equally prioritized in radial menu 500, and thus equally spaced around the center location. Stage 510 also illustrates the movement of cursor 505 from the center of the menu, to location 515 between the center of the menu and the displayed icon for Item F (106), to location 525 outside the displayed icon for Item F (106). The rapid movement of cursor 505 in this direction is a gestural movement that causes the selection of Item F (106). In some embodiments, the item selected by such a gestural movement is dependent on the angle of the cursor movement. When the angle of the cursor movement falls within the range of angles assigned to a particular item, the particular item is selected. In stage 510, the angle of cursor movement is an angle that is assigned to menu item 106.

Stage 520 illustrates the result of selecting Item F (106) via gestural selection. The selection of item 106 causes sub-menu 550 to open. In some embodiments, as shown, the sub-menu opens as a radial menu centered at the location of the cursor after a gestural selection. In some embodiments, the sub-menu is not displayed at this location until selection input (e.g., a mouse click, tap of a touchpad, keystroke, etc.) is received from the user. Upon receiving this input, the sub-menu is displayed around the cursor such that the user can then easily select an item from the sub-menu via gestural or other input.

While many of the examples above and below illustrate a cursor as an icon (e.g., an arrow) that is moved by a user via input from a cursor control device such as a mouse, as is often the case with a number of popular computing systems, one of ordinary skill in the art will recognize that the concept of a cursor is not limited to such examples. In some embodiments, for example, the cursor is not displayed and is defined as a location at which a user is touching the screen (i.e., when the radial menu is displayed on a touchscreen). Thus, the cursor moves as a user's finger (or other object touching the touchscreen) moves, though no icon is actually displayed.

The above provided examples of a number of novel features of radial menus. Several more detailed embodiments of the invention are described in the sections below. Section I describes the assignment of priorities to menu items and the display of radial menus based on these priorities. Section II then describes the highlighting and selection of menu items in radial menus according to some embodiments. Section III follows this with description of gestural selections and opening sub-menus as a result of gestural selection. Section IV illustrates various uses of the radial menus of some embodiment. Next, Section V describes the software architecture of an application that employs the radial menus of some embodiments, and Section VI describes a computer system that implements some embodiments of the invention.

I. Display of Radial Menus

As described above, some embodiments of the invention provide radial GUI structures such as radial menus that include multiple selectable items arranged about a central location. The selectable items, in some embodiments, are individual icons, as shown in FIGS. 1-5 above. That is, the selectable items are not contiguous slices of a circle or other shape. In some embodiments, these individual icons are arranged around the central location according to a priority that is assigned to each selectable item.

Figure 6:
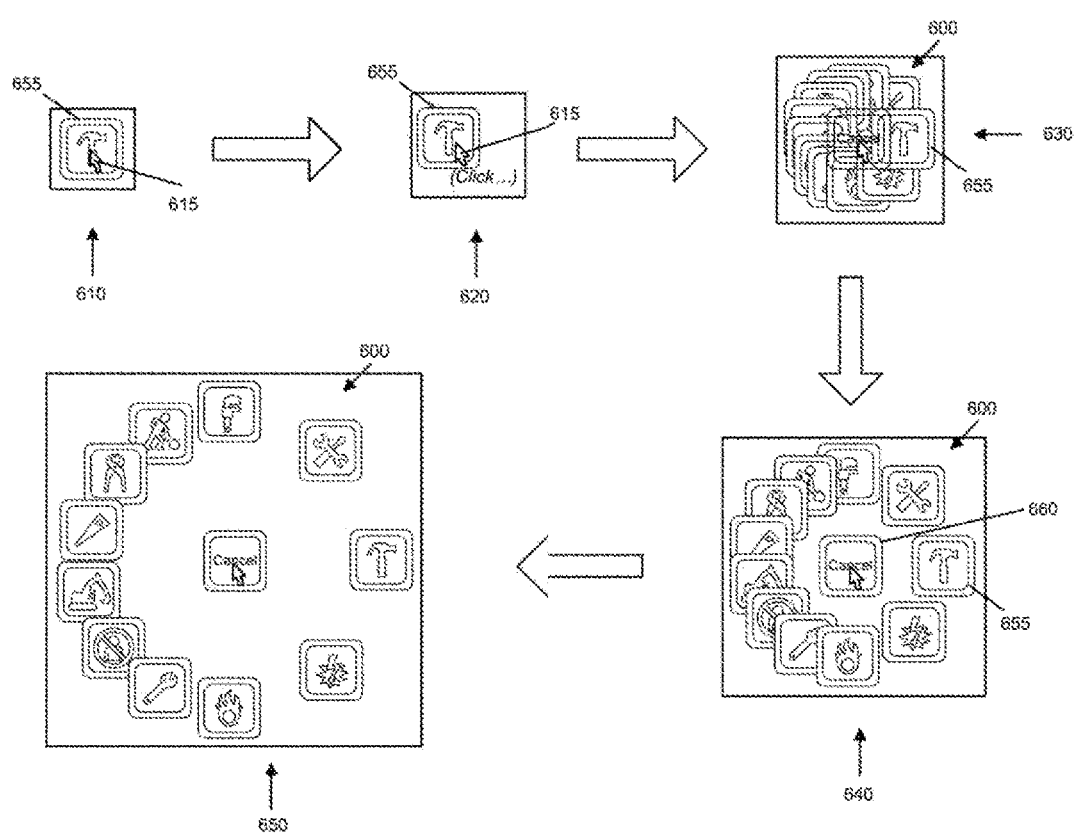
FIG. 6 illustrates the opening and display of a radial menu with selectable items arranged non-uniformly about a central location.

FIG. 6 illustrates the opening and display of such a radial menu with selectable items arranged non-uniformly about a central location. FIG. 6 illustrates the opening and display of the radial menu 600 in five stages, 610-650. Stage 610 illustrates the display of a single selectable item, stage 620 illustrates the selection of the single item, stages 630 and 640 illustrate the opening of the radial menu in response to this selection, and stage 650 illustrates the fully opened radial menu.

The radial menu is displayed as part of different GUIs in different embodiments. For instance, the radial menu could be part of the GUI of an operating system, an application that runs on an operating system (e.g., a media-editing application, a word processing application, a computer game, etc.), or a stand-alone application on a computer, a handheld device (e.g., a cell phone, media player, etc.), or other computing device. While the example of FIG. 6 and other examples below illustrate the radial menus displayed in front of an empty background, one of ordinary skill will recognize that in some embodiments the radial menu items are displayed over other UI items when the radial menu is invoked.

As noted, stage 610 illustrates the display of a single selectable item 655. In some embodiments, the display of a radial menu is invoked by the selection of an initially-displayed single selectable item such as item 655. Such an item is displayed permanently in the GUI of which the radial menu is a part in some embodiments. Some GUIs include multiple of these selectable items, the selection of each of which invokes a different radial menu. On the other hand, some GUIs only include one such selectable item.

In some embodiments, as is the case with item 655, the single selectable item displayed permanently in the GUI is one of the selectable items of the radial menu. For instance, in some embodiments, the different selectable items in the radial menu are various tools (e.g., video-editing tools), only one of which can be active at a particular time. Thus, the single selectable item displayed when the radial menu is not invoked is the currently active tool (either the default tool or the most recently selected tool) in some embodiments.

Stage 610 also illustrates a cursor 615 over the selectable item 655. Stage 620 illustrates the selection of item 655 via a mouse click with the cursor over the item. While the mouse click is illustrated conceptually by the text "(Click . . . )" in the GUI of stage 620, different embodiments illustrate the selection of an item for invocation of a radial menu in different ways, including doing nothing except for opening the radial menu. Other embodiments flash the selected item in a different color than its initial display. Some embodiments change the color of the selectable item when the cursor is initially over the item (e.g., at 610), to indicate that a click (or other selection input) will select the menu item and thus invoke the radial menu.

While a mouse click is described as causing the invocation of a radial menu, one of ordinary skill in the art will recognize that different selection inputs are possible to invoke the radial menu. For example, different cursor controllers can be used in some embodiments, such as touchpads, graphics tablet and stylus, etc. Different cursor controllers will have different selection inputs (e.g., selection input from a mouse might be a click, double-click, right-click, etc., whereas selection input from a touchpad could be a tap, double-tap, two-finger tap, etc.). Furthermore, some embodiments display the radial menu on a touchscreen (e.g., a touchscreen of a handheld device) that does not display a cursor at all. Instead, a user can select an item by tapping the touchscreen at the location where the item is displayed.

Returning to FIG. 6, stages 630 and 640 illustrate the opening process of some embodiments for radial menu 600. As shown, in some embodiments, the radial menu opens, upon invocation, with the selectable menu items spiraling outwards from the location of the initial selectable item, which becomes the center of the radial menu item. Stage 630 illustrates the radial menu 600 shortly after the selection of item 655. At this point, the number of menu items in the radial menu 600 (eleven items) can be discerned, but the content of most of the different items cannot be.

Stage 630 also illustrates the order of the different items. The eleven items are displayed as though they were all stacked underneath the initial item 655. That is, moving around the circle of items clockwise from item 655, each item is displayed underneath the previous item. As can be seen from the following stages, this follows the order in which the items are eventually displayed around the menu. Some embodiments always display the same item as the top menu item in this stacked order (e.g., in the case where the item selected to invoke the menu is not one of the items of the menu), whereas other embodiments display the menu item that was selected to invoke the menu as the top menu item in the order (e.g., in embodiments that display the most recently selected menu item as the item to invoke the menu).

Stage 640 illustrates the radial menu 600 in the middle of its outward expansion opening process. At this point, the visual content of the different menu items (i.e., the graphics of each icon) is discernible, as the items have spread far enough apart that the majority of each icon is visible. The items remain in their order from stage 630, both proceeding clockwise around the circle and in the stacking, although some of the items are far enough apart that the stacking aspect is no longer noticeable.

Stage 640 also illustrates a "Cancel" item that has appeared underneath the cursor in the location originally occupied by item 655. Some embodiments display such an option so that a user is not forced to select one of the menu items in order to close the menu. This can be especially useful in the case where the menu items represent various commands, rather than different tools which can be active or inactive. For instance, if the radial menu is part of an operating system, and the user selects an item to invoke the "shut down" menu but then decides they do not want the computer to shut down, restart, hibernate, etc., the user could select a cancel option in order to remove the full menu from the GUI.

At stage 650, the radial menu 600 is fully opened. As can be seen, the various selectable menu items are not spread out evenly around the central location. Some embodiments display certain items further from neighboring items and other items closer to neighboring items. In some embodiments, as will be described in greater detail below, a user can select a particular item whenever the cursor is at an angle from the center location that is associated with the particular item, and the items that are displayed further from their neighbors are associated with a larger set of angles and are thus easier to select.

Accordingly, some embodiments assign different priorities to the items and determine the distances between neighboring items based on these priorities. In some embodiments, the priorities are based on the frequency of selection. That is, a menu item that is selected most often will have the largest gaps between its neighboring menu items in the radial menu. As such, the appearance of a particular menu may change as the different menu items are selected more or less often.

Figure 7:
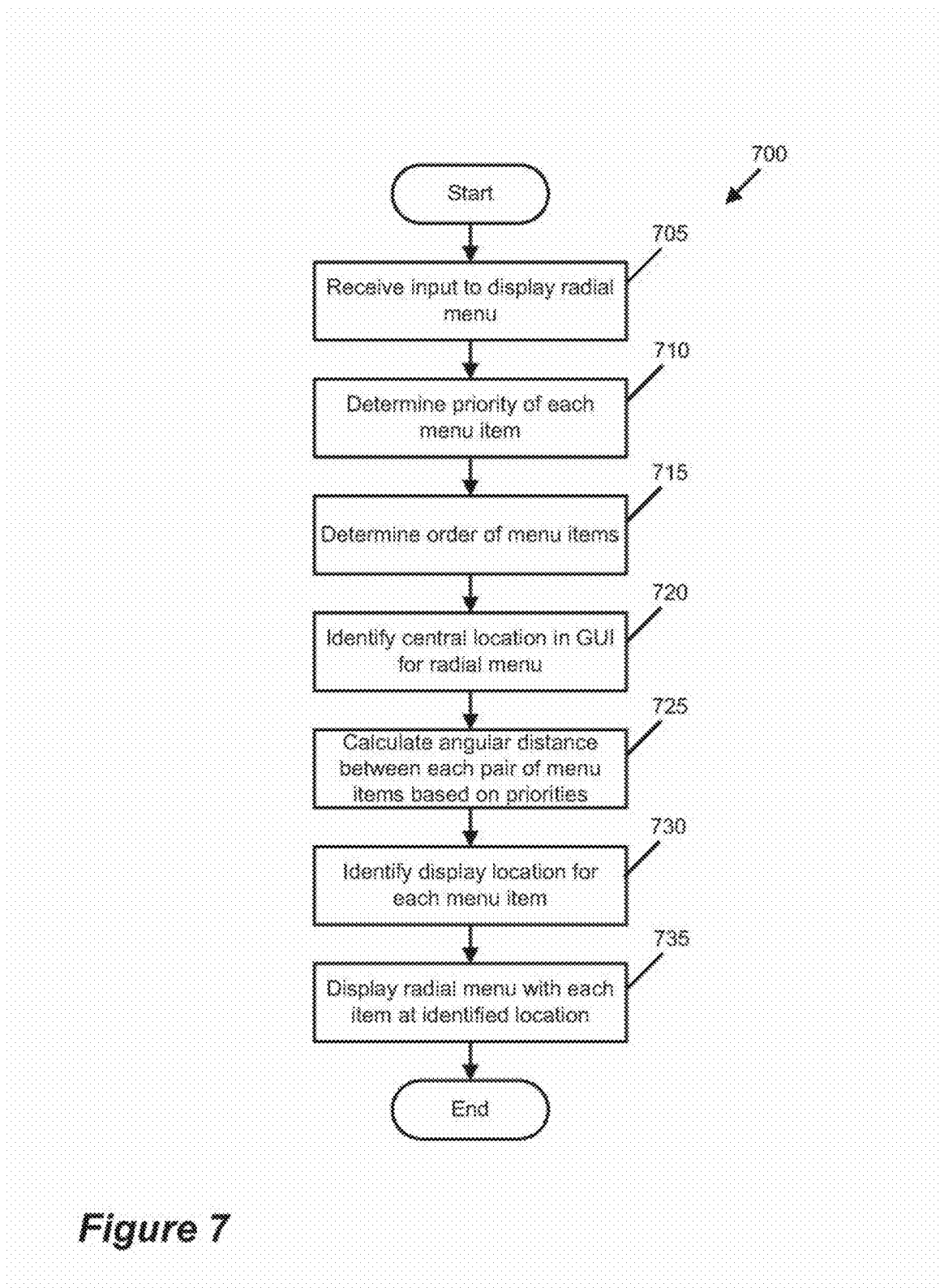
FIG. 7 conceptually illustrates a process of some embodiments for displaying a radial menu with the selectable items arranged non-uniformly around a central location in a GUI.

FIG. 7 conceptually illustrates a process 700 of some embodiments for displaying a radial menu with the selectable items arranged non-uniformly around a central location in a GUI, such as menu 600 of FIG. 6. As shown, process 700 begins by receiving (at 705) input to display a radial menu. This input can be the selection of a menu item that invokes a radial menu, as illustrated above in FIG. 6. In some cases, the input is keyboard input (i.e., a key or set of keys that a user presses to cause the radial menu to be displayed. The input could also simply be input to open an application that includes a permanently displayed radial menu.

The process then determines (at 710) a relative priority for each menu item. In some embodiments, the priority for each item indicates how much space it is given relative to other menu items in the displayed radial menu. The priorities are integer values (e.g., 1, 4, 11, etc.) in some embodiments. In other embodiments, the menu items are assigned priorities as percentages such that the priorities for all of the menu items add up to one hundred percent. The percentages are based on the number of times the different menu items have been selected in some embodiments. As a simple example, if a particular menu with four menu items has been opened 20 times and menu item A has been selected seven times, menu item B twice, menu item C six times, and menu item D five times, then menu item A would be assigned a priority of 35%, menu item B a priority of 10%, menu item C a priority of 30%, and menu item D a priority of 25%. Some embodiments also have maximum and/or minimum priorities such that rarely-selected items do not all end up on top of each other. Other embodiments allow a user to manually determine the priorities (e.g., via an application setup window) or have the priorities coded in by a software developer.

Process 700 next determines (at 715) an order for the menu items. In some embodiments, this order is predetermined (e.g., by a user or by a software developer) and does not change. A user might not want the order of the menu items to change, as users will often learn where regularly selected menu items are found and can select these items without paying too much attention. However, in other embodiments, the order is determined based on the priorities. In some embodiments, the menu item with the highest priority (i.e., largest amount of allocated space between neighboring items) is first in the order and then the two items with the next highest priority are on either side of this item, with the next two items after that, and so on. This clusters the higher priority items to one side of the radial menu, as illustrated in FIG. 6.

Next, the process identifies (at 720) a central location in the GUI for the radial menu. In some embodiments, this central location is the location of an initial single selectable item that is selected to invoke the opening of a radial menu, as in FIG. 6. However, in some such cases, this location is too close to the edge of a display area (e.g., window, display device, etc.) for the radial menu to be fully displayed within the display area. To rectify this, some embodiments resize the radial menu when its regular size would be occluded by one or more edges.

Other embodiments address this situation by moving the central location for the radial menu to a different location in the GUI. Some embodiments move the central location directly away from the edge that is preventing full display of the radial menu to a point that allows the radial menu to fit into the display area. In some embodiments, the radial menu is moved so that it barely fits into the display area (i.e., so that it abuts or almost abuts the edge or edges that it moved away from). Some embodiments animate the movement of the radial menu away from one or more edges that would obscure it, in order to make the appearance of the radial menu more interactive.

Such relocation of the radial menu is especially useful when the radial menu is implemented on a small display device, e.g., a small handheld device. One such example of a small handheld device that uses the radial menus of the invention will be described below by reference to FIG. 23. Also, given that a radial menu might take up a large segment of the screen of a handheld device, some embodiments always display the radial menu in the center of the handheld device's screen when the menu is invoked. Thus, if there are multiple radial menus that are invoked by selection of different selectable items, they may all use the same central location in the GUI of the handheld device.

The movement, relocation and/or resizing operations that are described above are equally application to any situation when a radial menu or sub-menu is invoked. In other words, some embodiments move, relocate and/or resize a radial menu or sub-menu whenever the menu or sub-menu is invoked near one or more display screen edges, which would occlude the menu or sub-menu if the menu or sub-menu was not resized, moved away from the edge, or relocated to a particular location (e.g., center). Thus, some embodiments use the relocation and/or resizing operations for many of the processes described below (e.g., for the menu selection processes described below by reference to FIGS. 9-20).

Figure 8:
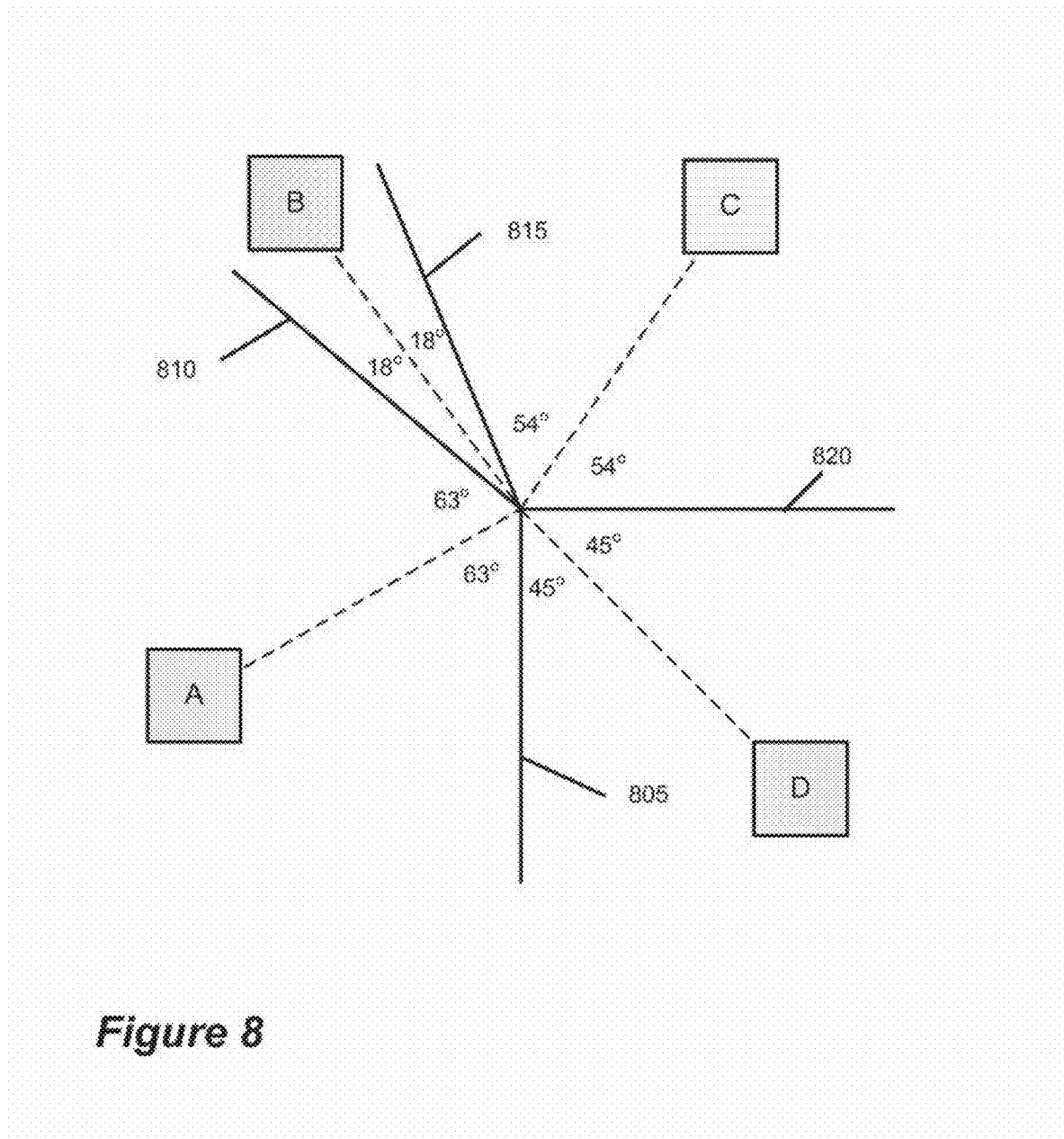
FIG. 8 illustrates the assignment of angular regions to each menu item in a radial menu according to some embodiments.

Process 700 then calculates (at 725) the angular distance between each pair of menu items based on the priorities determined at 710 and the order determined at 715. Some embodiments assign a particular angular region of the radial menu to each menu item and center the menu item in this angular region. FIG. 8 illustrates this using the example from above with four menu items. Menu item A (priority of 35%) would be assigned to an angular region of 126 degrees (from line 805 to 810), menu item B (priority of 10%) to an angular region of 36 degrees (from line 810 to line 815), menu item C (priority of 30%) to an angular region of 90 degrees (from line 815 to 820) and menu item D (priority of 25%) to an angular region of 108 degrees (from line 820 to line 805. Locating these menu items in the center of their assigned angular region, the distance from item A to item B is 81 degrees, the distance from item B to item C is 72 degrees, the distance from item C to item D is 99 degrees, and the distance from item D to item A is 108 degrees.

Next, the process identifies (at 730) a location to display each of the menu items. In some embodiments, the locations are dependent on a radial distance at which the menu items are located from the central location of the menu. In some embodiments, this distance is determined either manually by a user or by a software developer that develops the application featuring the radial menu. Other embodiments vary the distance based on the angular distances between the menu items. If some items are very close together, then some embodiments use a larger radial distance so that there will not be too much overlap between the items.

To determine the actual locations, a first location for a first item is set. Some embodiments fix the location of the first item in the order determined at operation 715. For instance, the first item might always be located directly to the right of the central location, as is the case with menu 600 of FIG. 6. Once one of the item locations is set, the other menu item locations can be determined by moving the appropriate angular distances (as determined at 725) around a circle with the determined radial distance for the menu.

With the display locations identified for all of the menu items, process 700 displays (at 735) the radial menu with each of the items at the identified location. As illustrated in FIG. 6, some embodiments display the menu by expanding the menu items outward from a central location. Other embodiments simply display the items immediately in the locations determined at 730. Still other embodiments use animation other than that shown in FIG. 6, such as displaying the menu items spiraling into place.

Once a radial menu is opened, a user may select an item from the radial menu. Various aspects of displaying the menu and the selection of menu items will be discussed in the following sections.

II. Display of Radial Menus During Selection Process

As described above, radial menus present a user with multiple selectable items for the user to choose from. In some embodiments, a user can choose a particular selectable item by moving a cursor to the angular area of the radial menu allocated to the particular selectable item and providing selection input (e.g., clicking a mouse button, pressing a key on a keyboard, providing a particular form of input via a touchpad, etc.). Furthermore, in some embodiments, a user may select a menu item by pressing down on a touchscreen within the angular area allocated to the particular selectable item.

In some embodiments, a user need not click directly on a displayed menu item in order to select that menu item. Instead, the displayed item, or icon, is associated with a larger selectable item. For instance, in some embodiments, each icon is associated with an angular area. Clicking anywhere within the angular area will select the menu item. In some embodiments, this selectable area is not only between the central location of the menu and the icon, but extends out infinitely far from the center (or, to the edge of the display area in which the radial menu is displayed).

Figure 9:
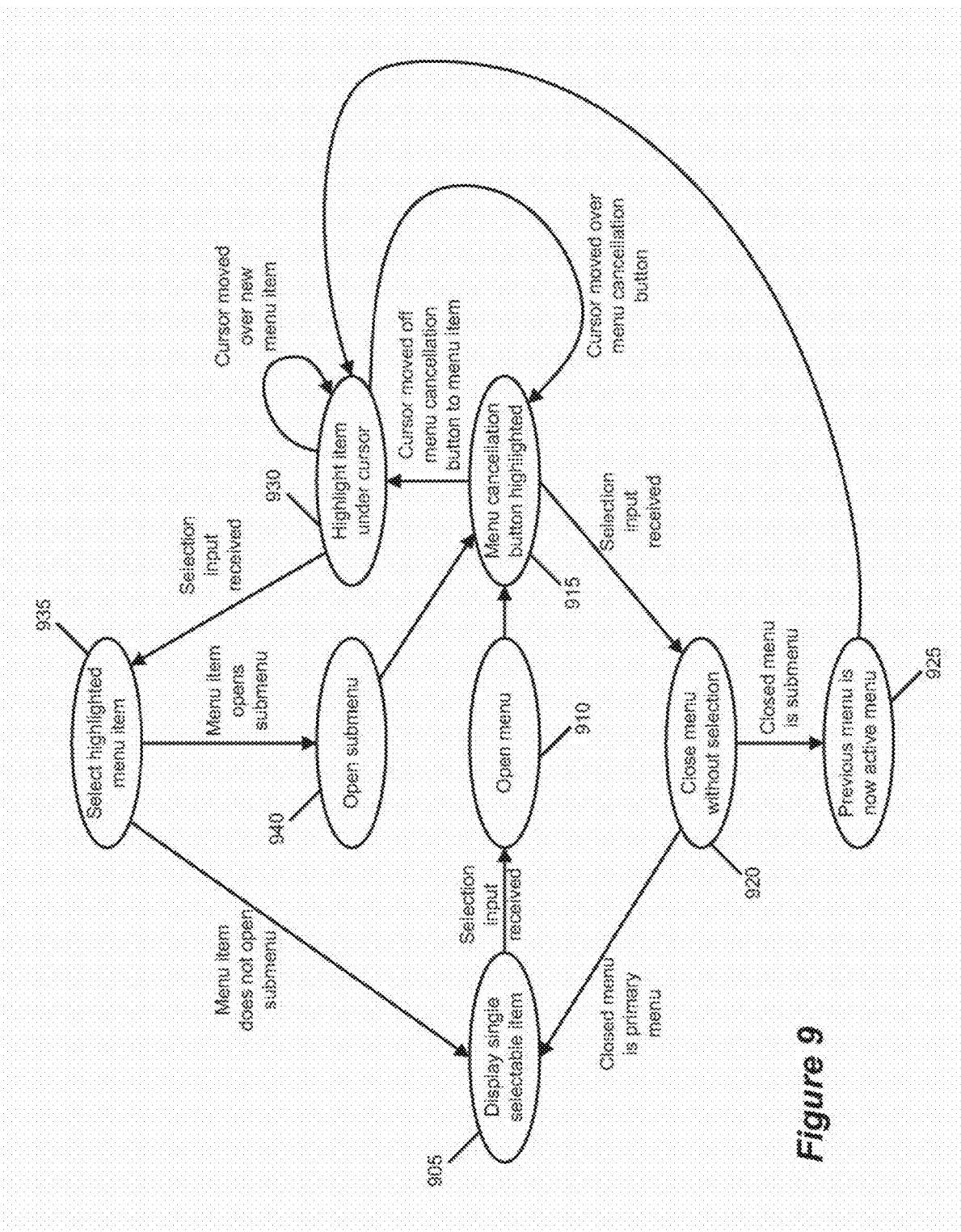
FIG. 9 illustrates a state diagram that reflects the various states and transitions between those states for a GUI that includes the radial menus of some embodiments.

The display and selection of radial menus of some embodiments will now be described by reference to FIG. 9. FIG. 9 illustrates a state diagram that reflects the various states and transitions between those states for a GUI that includes the radial menus of some embodiments. The display of the various states of the GUI and the transitions between the states are performed by one or more processes in some embodiments. That is, they are performed by one or more processes running as part of the application in whose GUI the radial menus are displayed. This application can be an operating system, stand-alone application, etc. in different embodiments. The states and transitions will be described by reference to FIGS. 6 and 10-13, which illustrate various aspects of the radial menus of some embodiments.

As shown, a single selectable item is displayed (at 905) initially. An example of such an item is item 655 at stage 610 of FIG. 6. When selection input is received (e.g., a user clicking on the single selectable item, as at stage 620 of FIG. 6), the GUI transitions to state 910 and opens a radial menu. Opening the radial menu, in some embodiments, entails the expansion of the menu items outwards, as shown in stages 630 and 640 of FIG. 6. However, other embodiments simply display the menu items of the radial menu in their locations when the radial menu is opened, without any animation.

Once the radial menu is open, the GUI transitions to state 915 to highlight the menu cancellation button. Stage 650 of FIG. 6 illustrates radial menu 600 with cursor 615 over menu cancellation button 660. In the case where the menu cancellation button is at the center of the radial menu and this center is the initial location in the GUI of the single selectable item selected to invoke the radial menu, then upon the opening of the radial menu the cursor will be over the menu cancellation button, as is the case in stage 650. As noted above, the menu cancellation button of some embodiments enables a user to close the radial menu without making a selection of one of the menu items.

When selection input is received while the menu cancellation button is highlighted, the GUI transitions to state 920 to close the currently active menu without a selection. That is, if the user selects the menu cancellation button, the radial menu closes and none of the menu items are selected. When the currently active menu (that is, the menu being closed) is a primary menu (i.e., a radial menu that is not a sub-menu of another radial menu), the GUI transitions back to state 905 as the single selectable item (e.g., item 655 of FIG. 6) is displayed again.

On the other hand, when the currently active menu is a radial sub-menu, the GUI transitions to state 925 to make the previous menu (i.e., the parent menu of the closing sub-menu) the active menu. Further details regarding the selection and display of sub-menus are described below. The GUI then transitions to 930 to highlight the item in the parent menu that is under the cursor. In some embodiments, as is described further below, a sub-menu is displayed as a radial menu with the central location at the location of the item from the parent menu that opened the sub-menu. As such, the cursor will be over this item from the parent menu when the menu cancellation button is selected, and thus this item is highlighted when the GUI transitions from state 925 to state 930. The highlighting of menu items will be discussed in further detail below.

Figure 10:
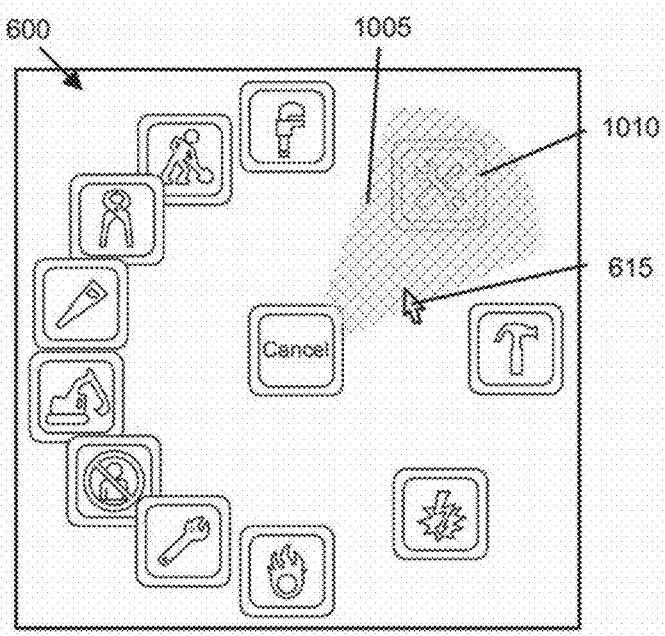
FIGS. 10 and 11 illustrate the radial menu of FIG. 6 with a cursor over two different menu items so that the menu items are highlighted.
Figure 11:
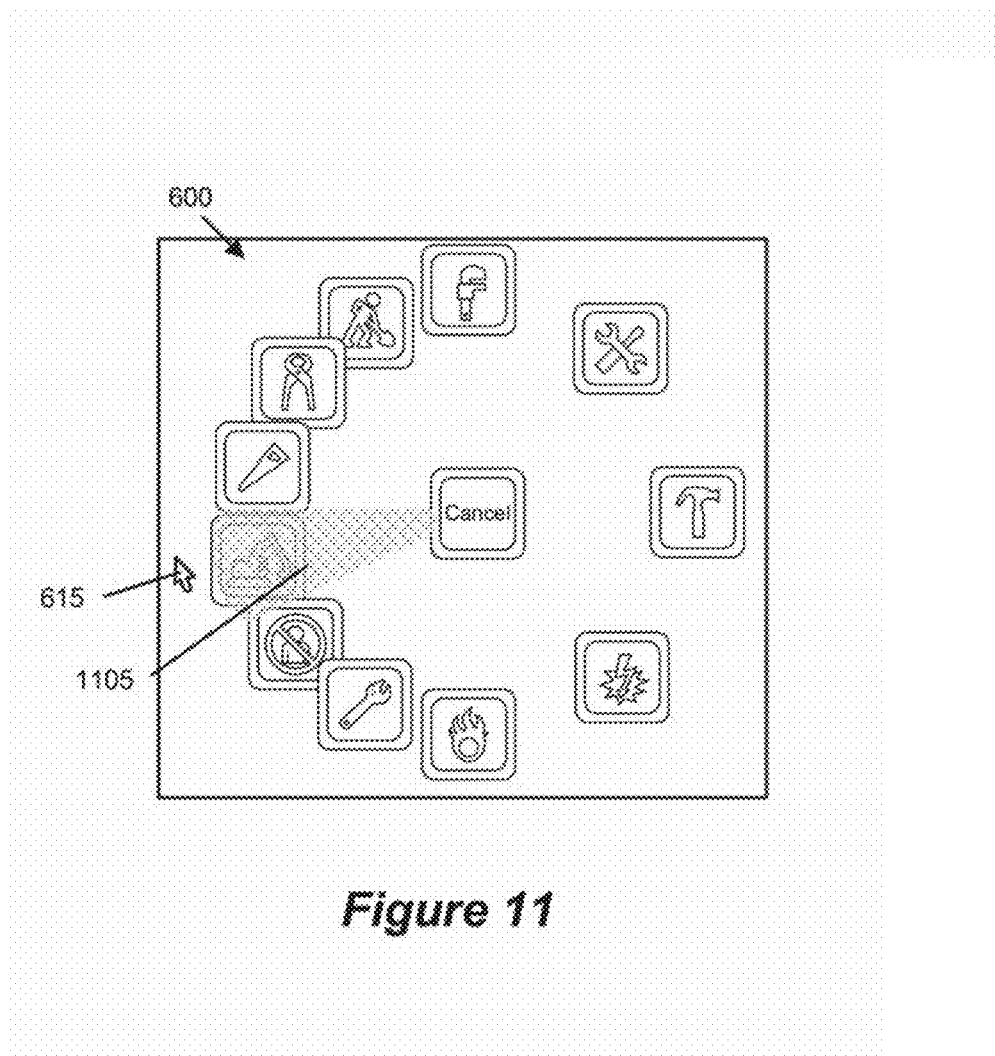

When the GUI is at state 915, and the cursor is moved off of the menu cancellation button to a menu item, the GUI transitions to state 930 and highlights the menu item underneath the cursor. FIGS. 10 and 11 illustrate radial menu 600 with the cursor 615 over two different menu items. In FIG. 10, menu item 1005 is highlighted. Cursor 615 is not actually over the icon 1010 that represents menu item 1005, but is over the angular region in the radial menu assigned to menu item 1005, and menu item 1005 is accordingly highlighted.

In some embodiments, a menu item is highlighted as shown in FIG. 10. The highlight shown for menu item 1005 has the appearance of a light emanating from the central location for the radial menu to illuminate the icon 1010 and the area in which a user can click to select menu item 1005. Other embodiments use other techniques to highlight a menu item. Some embodiments display the radial lines on either side of the menu item that indicate the extent of the selectable item, or change the color of the area of the selectable item so that it is different from the background. Other embodiments only change the display of the icon representing the menu item (e.g., by changing the color of the icon), rather than highlighting the entire selectable area.

As shown in FIG. 9, if the cursor is moved back over the menu cancellation button from one of the menu items, then the GUI transitions from state 930 back to 915. If the cursor is moved off of a first menu item and over a second menu item, then the GUI remains at state 930 with the second menu item highlighted. FIG. 11 illustrates the highlighting of item 1105. In order for the GUI to proceed from the state in FIG. 10 to that of FIG. 11, a user would need to move the cursor 615 either through multiple selectable items that would each be highlighted for a short period of time, through the menu cancellation button (i.e., a transition from state 930 to 915 and back to 930), or some combination of the two.

In FIG. 11, cursor 615 is outside the display of the radial menu. That is, the cursor 615 is further from the center of the radial menu than the displayed icons. However, selectable item 1105 is nevertheless highlighted. In some embodiments, the selectable items extend out to an infinite radius, or at least to the edge of the display area (window, screen, etc.) for the GUI that includes the radial menu. Some embodiments extend the highlighting out past the displayed icon. As in the example, other embodiments only highlight from the center to the displayed icon or a bit past the displayed icon.

Returning to FIG. 9, if selection input is received when the GUI is at state 930, the GUI transitions to state 935 at which the highlighted menu item is selected. Different types of input are accepted for selecting a menu item in different embodiments. Some embodiments enable gestural selection. A user moves the cursor in a quick sweeping motion away from the center of the radial menu through one of the selectable items. Based on the direction, speed, and distance of the cursor motion, the selectable item through which the cursor is moved is selected in some embodiments.

Some embodiments enable a user to select an item by using a cursor controller button or similar input with the cursor over the item either in addition to or instead of gestural selection. For instance, a user can click (or double-click) a mouse button, tap (or double-tap) a touchpad, etc. to select an item. Similarly, in the case where the radial menu is presented on a touchscreen, a user can tap (or double-tap) the screen over a menu item in order to select the menu item.

If the selected menu item opens a submenu, the GUI transitions to state 940. In some embodiments, the sub-menu opening process is similar to the primary menu opening process, in that the menu items expand outwards from a central location. When the sub-menu is opened based on a mouse click or similar input, the central location for the sub-menu is the cursor location where the selection input is received in some embodiments. In other embodiments, the central location is the displayed icon representing the selected menu item that caused the sub-menu to open. Some such embodiments automatically move the cursor to this central location when the sub-menu is opened.

Figure 12:
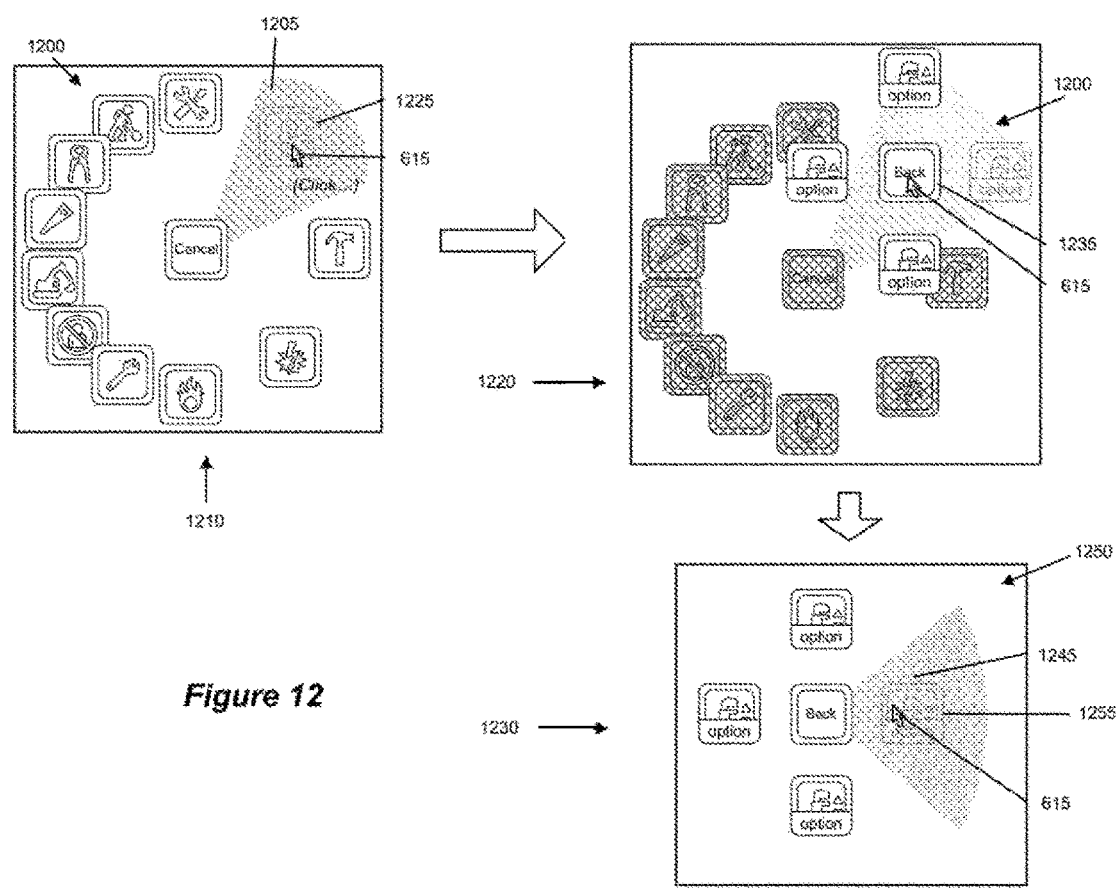
FIG. 12 illustrates the opening of a sub-menu in response to a selection of a menu item from a primary menu according to some embodiments.

FIG. 12 illustrates the opening of a sub-menu 1250 in response to a selection of a menu item 1205 from a primary menu 1200 according to some embodiments. FIG. 12 illustrates this process in three stages, a first stage 1210 at which the menu item is selected, a second stage 1220 at which the sub-menu is fully opened and the cursor is over a menu cancellation button for the sub-menu, and a third stage 1230 at which the cursor is over one of the menu items of the sub-menu.

Stage 1210 illustrates primary menu 1200. Primary menu 1200 has numerous menu items, including menu item 1205, which is presently highlighted because cursor 615 is over item 1205. Furthermore, stage 1210 illustrates that a user has just clicked a cursor controller button with the cursor over item 1205.

Selection of menu item 1205 causes a sub-menu 1250 to open, as illustrated in stage 1220. Stage 1220 illustrates the sub-menu 1250 after the sub-menu has fully opened. The sub-menu opening process of some embodiments is similar to the primary menu opening process illustrated in FIG. 6, in that the icons representing the menu items expand outwards from the center to their assigned locations.

Returning to the state diagram of FIG. 9, the GUI transitions from 940 to 915, with the menu cancellation button of the recently opened submenu now highlighted. One of ordinary skill will recognize that this represents the transition in the case that the sub-menu opens around the cursor, or in which the cursor is automatically moved to the center of the sub-menu. In the case where a user clicks somewhere in a selectable item to open a sub-menu and the sub-menu opens around the icon for the selectable item and not around the cursor, some embodiments will transition directly from state 940 to state 930 to highlight whichever item the cursor is over.

In this example, the user has clicked with the cursor 615 directly over the icon 1225 representing menu item 1205, and thus the cursor is over the menu cancellation button 1235 at stage 1220. As illustrated at stage 1220, when the cursor is over the menu cancellation button of a sub-menu, some embodiments display the parent menu as partially faded. This indicates to the user the menu that would become active if selection input is received without overcomplicating the display in the area of the sub-menu.

As illustrated in stage 1230, when the user moves the cursor off of the menu cancellation button and over a menu item 1245. This corresponds to a state transition from state 915 to 930, and as such menu item 1245 is highlighted. As sub-menu 1250 includes only four evenly-spaced items, the highlighting extends significantly beyond the icon 1255 in the angular direction, occupying ninety degrees of the circle. The highlighting also extends significantly beyond the icon 1255 in the radial direction as well, as is the case in some embodiments.

Returning to the state diagram of FIG. 9, if the menu item selected does not open a sub-menu, the GUI transitions from state 935 to state 905 such that only the initial single selectable item is displayed. Items that do not open sub-menus may activate a tool (e.g., a media-editing tool, a word-processing tool, etc.), cause a command to be performed (e.g., a print command, a save command, etc.), or cause other instructions to be performed.

In closing the radial menu such that only the single selectable item is displayed, some embodiments display the icons collapsing inwards, the opposite animation as that displayed when the radial menu is opened. Other embodiments simply stop displaying the radial menu, and replace the menu cancellation button with the single selectable item for invoking the radial menu.

Figure 13:
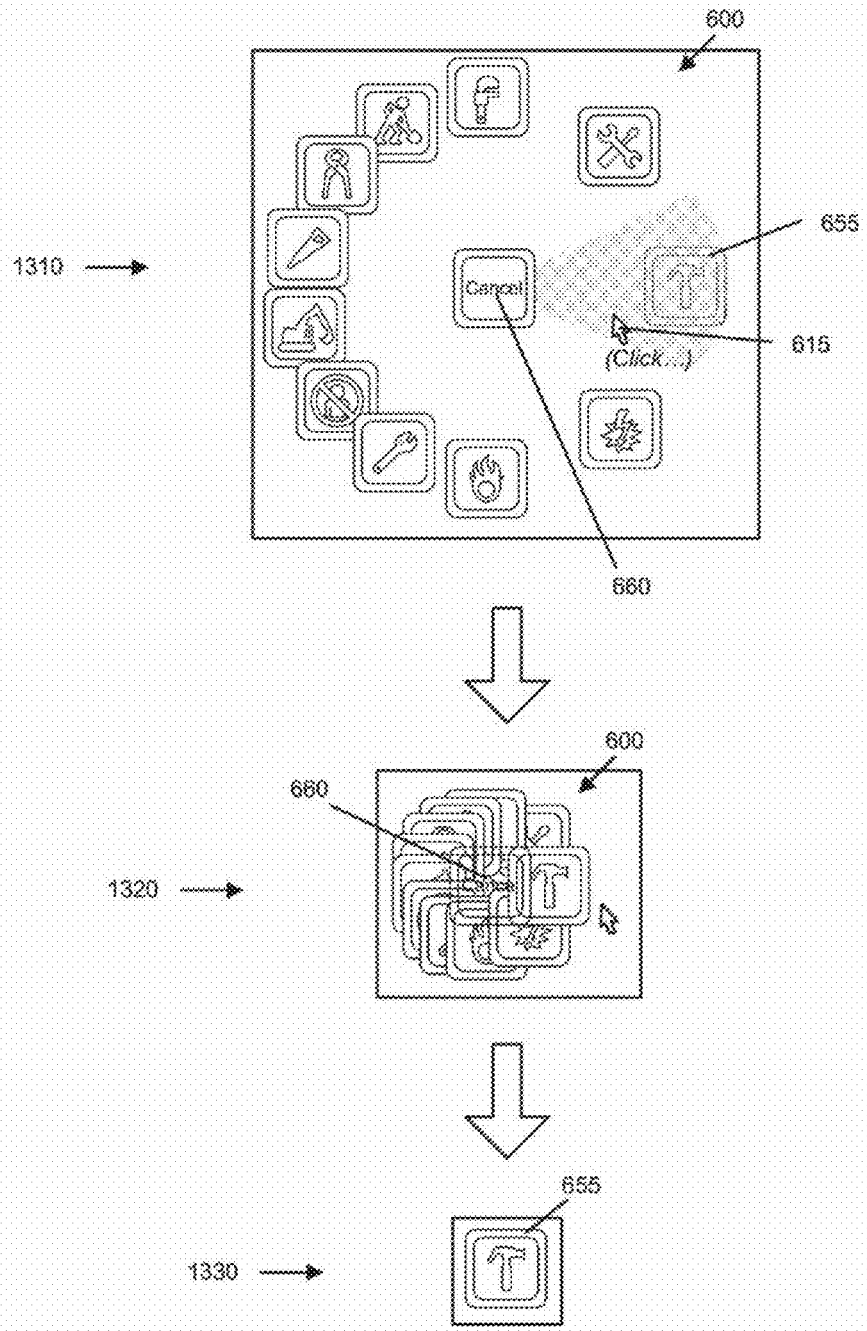
FIG. 13 illustrates the selection of an item from a radial menu and the subsequent closing of the radial menu.

FIG. 13 illustrates the selection of an item from radial menu 600 and the subsequent closing of the radial menu. FIG. 13 illustrates this in three stages, a first stage 1310 at which a user selection of item 655 from the radial menu is selected, a second stage 1320 during the closing process for the radial menu 600 and a third stage 1330 at which only the single selectable item 655 is displayed.

As noted, stage 1310 illustrates radial menu 600, which includes menu item 655. Menu item 655 is highlighted in this stage because cursor 615 is over the selectable item. This stage also indicates that selection input (e.g., a click of a mouse button) has just been received with the cursor in its present location over the highlighted selectable item. In response to the selection of item 655, any instructions associated with this item are performed.

In addition to the performance of instructions associated with the selected menu item, stage 1320 illustrates the radial menu 600 partway through its closing process. Stage 1320 illustrates that the menu items have moved closer to the center of the menu, and they retain the "stacked" nature that is also illustrated in FIG. 6. Some embodiments, display the recently-selected item on the top of the stack, while other embodiments designate a particular menu item at the top of the stack. Stage 1320 also illustrates that the menu cancellation button 660 has mostly faded as the menu closes.

Stage 1330 illustrates the single selectable item 655 after radial menu 600 has fully closed. At this point, the GUI has returned to the same state as illustrated at stage 610 of FIG. 6, before the menu was opened (which corresponds to state 905 of the state diagram illustrated in FIG. 9).

III. Gestural Selections and Sub-Menus

As noted above in the description of the state diagram, in addition to (or instead of) receiving click (via a mouse or other cursor controller) or tap (via a touchscreen) input in order to select a particular menu item from a radial menu, some embodiments enable gestural selection input.

In some embodiments, the gestural selection input for selecting a radial menu item is a sweep gesture. A sweep gesture is an outward movement of the cursor towards or through a selectable item in some embodiments. The cursor movement is accompanied by other cursor controller or other input as well in some embodiments. For instance, in some embodiments, a user holds down a mouse button (or equivalent input) while moving the mouse to perform a sweep gesture. Some such embodiments will not recognize a sweep gesture unless the mouse button is held down or equivalent input is received. On the other hand, some embodiments do not require any input other than the cursor movement to recognize a sweep gesture. In some embodiments, a user provides an initial selection input (e.g., a mouse click, a tap, etc.) in order to invoke a radial menu, and then the gestural input is only a mouse movement with no other associated input.

When the selected item causes a command to be performed or a tool to be activated, the result is the same as if click input was used to select the item. However, when the selected item causes a sub-menu to open, different embodiments use different techniques to determine where the sub-menu should be opened. Some embodiments open the sub-menu around the selected menu item as though a user had just clicked on the menu item, then move the cursor from its location at the end of the sweep gesture to the center of the radial sub-menu. Some embodiments predict the location in the GUI at which the cursor will stop moving based on speed, direction, acceleration, statistics of past gestural selections, etc. and display the sub-menu at this location.

Other embodiments do not display the sub-menu after the sweep gesture until further input is received. Instead, these embodiments wait until a user provides further input (e.g., a mouse click) to display the radial sub-menu. When the user does provide the further input, the sub-menu is then displayed around the cursor (i.e., the cursor is at the central location of the radial sub-menu). Some embodiments initially display the radial sub-menu with its central location at either the location of the selected menu item or at the central location of its parent menu, then move the sub-menu to the cursor location when user input is received.

Figure 14:
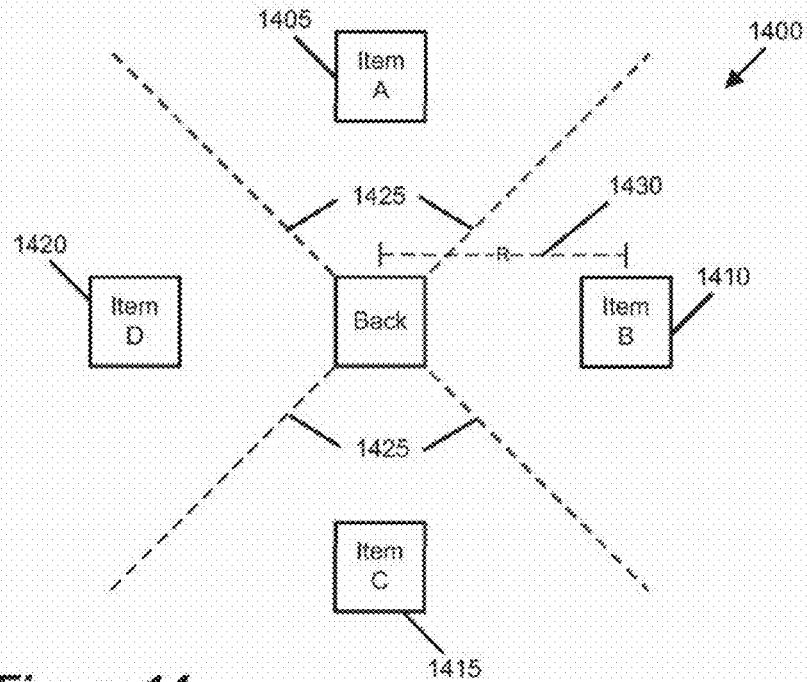
FIG. 14 illustrates a radial menu with four equally-spaced menu items.

FIG. 14 illustrates a radial menu 1400 with four equally-spaced menu items 1405-1420. FIG. 14 also illustrates dashed lines 1425 that indicate the angular areas allocated to the four menu items 1405-1420, and a dashed line 1430 indicating a distance R from the center of the radial menu 1400 to the center of one of the items of the radial menu.

Some embodiments do not recognize all movements of the cursor after the opening of the radial menu. Instead, for a movement of the cursor to be identified as gestural input, the cursor must move at least a particular threshold distance in the GUI. For instance, some embodiments require that the cursor move at least the radial distance of the menu (e.g., distance R represented by dashed line 1430 in FIG. 14). Thus, a cursor starting at the central location of the menu would need to move to the middle of a menu item if the user moved the cursor directly towards the menu item. Other embodiments use a different threshold (e.g., the distance to the beginning or end of the menu item, a fraction or multiple of the radial distance, etc.).

Furthermore, some embodiments also require that the cursor move the threshold distance in a threshold amount of time for the movement to be identified as a gestural selection. The slow movement of a cursor out towards a radial menu item will not be treated as a gestural selection.

Movements that are not close to being a straight line will not be recognized as gestural selection as well, in some embodiments. As the cursor moves, some embodiments identify the location of the cursor at very short intervals (e.g., many times per second). The location data can be used to calculate the speed and direction of the cursor movement over time. Some embodiments require that these calculated direction vectors remain within a particular angular range for the movement to be considered a gestural selection input. That is, the minimum angle and maximum angle at which the cursor is moving must vary by less than a particular threshold angle (e.g., 5 degrees, 20 degrees, etc.).

On the other hand, rather than determine the angular variation, some embodiments identify the start and end points of the potential gestural selection, then determine whether the cursor moved off of the straight line between the two points by more than a threshold amount. If the cursor moved too far off from this straight line, then the movement is not a gestural selection. In some embodiments, the threshold distance off of the straight line varies based on the distance between the start and end point, such that longer movements can have larger absolute variation (which may be an equivalent angular variation to a shorter movement with less absolute variation).

Some embodiments check for gestural selection input any time that the cursor has moved the threshold distance for a gesture. Once the cursor moves the threshold distance, the time taken to move the distance and whether the movement is close to a straight line are determined. In such embodiments, the actual gestural movement by the user may include numerous segments that would qualify as gestures, and the selected item is actually selected as soon as the first segment of the movement that qualifies as gestural input is identified.

Once a gestural selection is identified, some embodiments then determine the item selected by the gestural motion. In some embodiments, the selected item is the item through which the cursor passes when it reaches a particular distance from the center of the radial menu (e.g., the radial distance R represented by line 1430 in FIG. 14).

Figure 15:
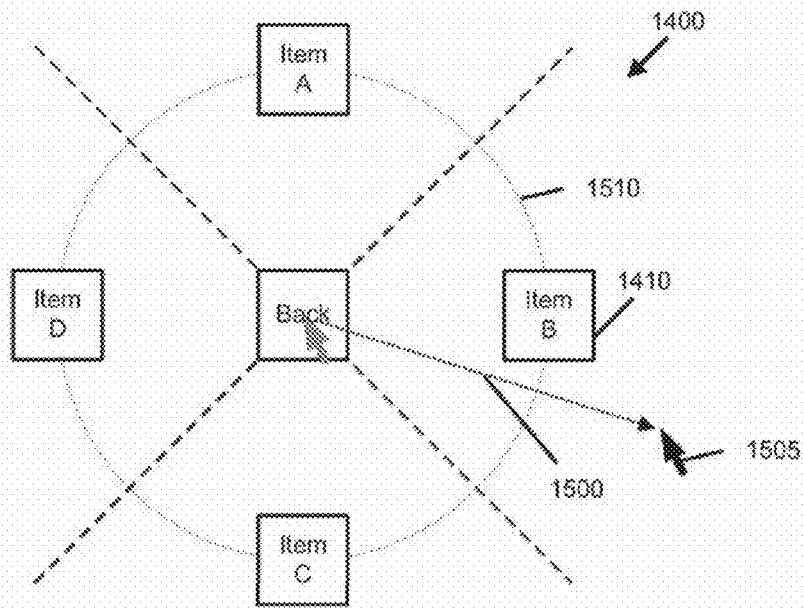
FIG. 15 illustrates the radial menu of FIG. 14 and a gestural movement of a cursor starting at the center of the radial menu.

FIG. 15 illustrates the radial menu 1400 and a gestural movement 1500 of cursor 1505. FIG. 15 also illustrates a dashed circle 1510 that indicates the radial distance of menu 1400. As shown, cursor 1505 starts at the center of the menu 1400 and moves more than the radial distance R. The gestural movement 1500 crosses the radial distance (indicated by dashed line 1510) within the angular area assigned to menu item 1410. As such, some embodiments would select menu item 1410 based on this input.

Rather than determining the absolute locations of the cursor, some embodiments identify an angle for the gestural movement and associate the angle with a menu item. In some embodiments, each item is associated with a range of angles that corresponds to the angular area occupied by the item in the radial menu. For instance, item 1405 of menu 1400 is associated with 135 degrees off the horizontal to 45 degrees off the horizontal, item 1410 is associated with 45 degrees off the horizontal to −45 degrees off the horizontal, etc. (i.e., the quadrants represented by the dashed lines 1425). In this description, the horizontal refers to the vector running from the center of the radial menu to the center of item 1410, typically associated with an angle of zero.

When the gestural movement starts at the center of the radial menu, either technique for identifying the menu item selected by the gesture will yield the same result. The gestural movement 1500 of FIG. 15 is an example of this. The angle of the movement 1500 is approximately 20 degrees below the horizontal, an angle associated with item 1410. As noted above, using the technique of identifying where the cursor crosses the radial distance also results in the selection of item 1410.

Figure 16:
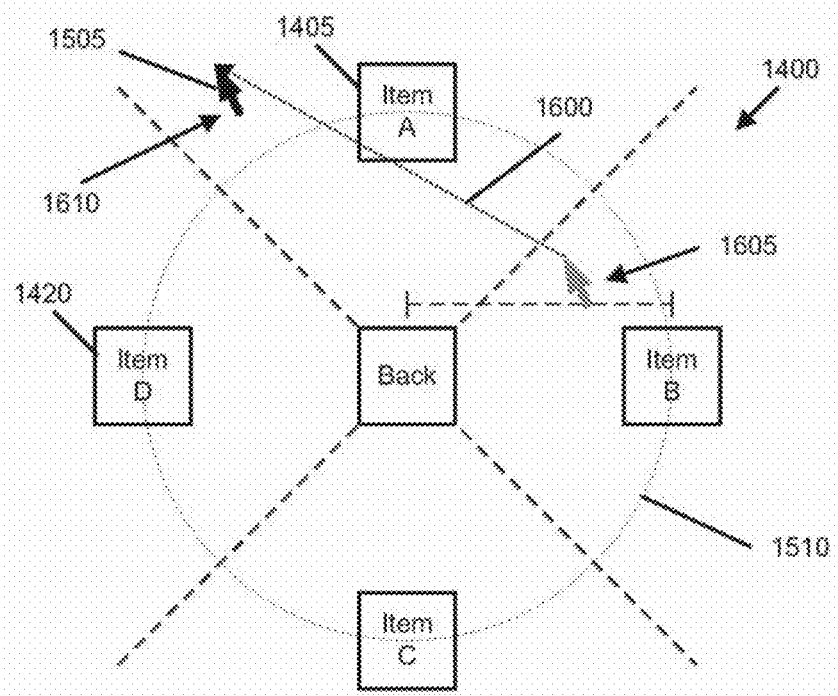
FIG. 16 illustrates the radial menu of FIG. 14 and a gestural movement of a cursor not starting at the center of the radial menu.

However, when the gestural movement does not begin at the center of the radial menu, the two techniques may yield different selections. FIG. 16 illustrates an example of such a gestural movement 1600. Cursor 1505 moves from location 1605 to location 1610, a long enough distance to be considered a gestural selection input. Based on where the cursor crosses the radial distance indicated by dashed line 1510, some embodiments would select item 1405. However, the angle of gestural movement 1610 is associated with item 1420, as it is approximately 150 degrees off the horizontal and the quadrant associated with item 1420 is from 135 degrees off the horizontal to −135 degrees off the horizontal.

Figure 17:
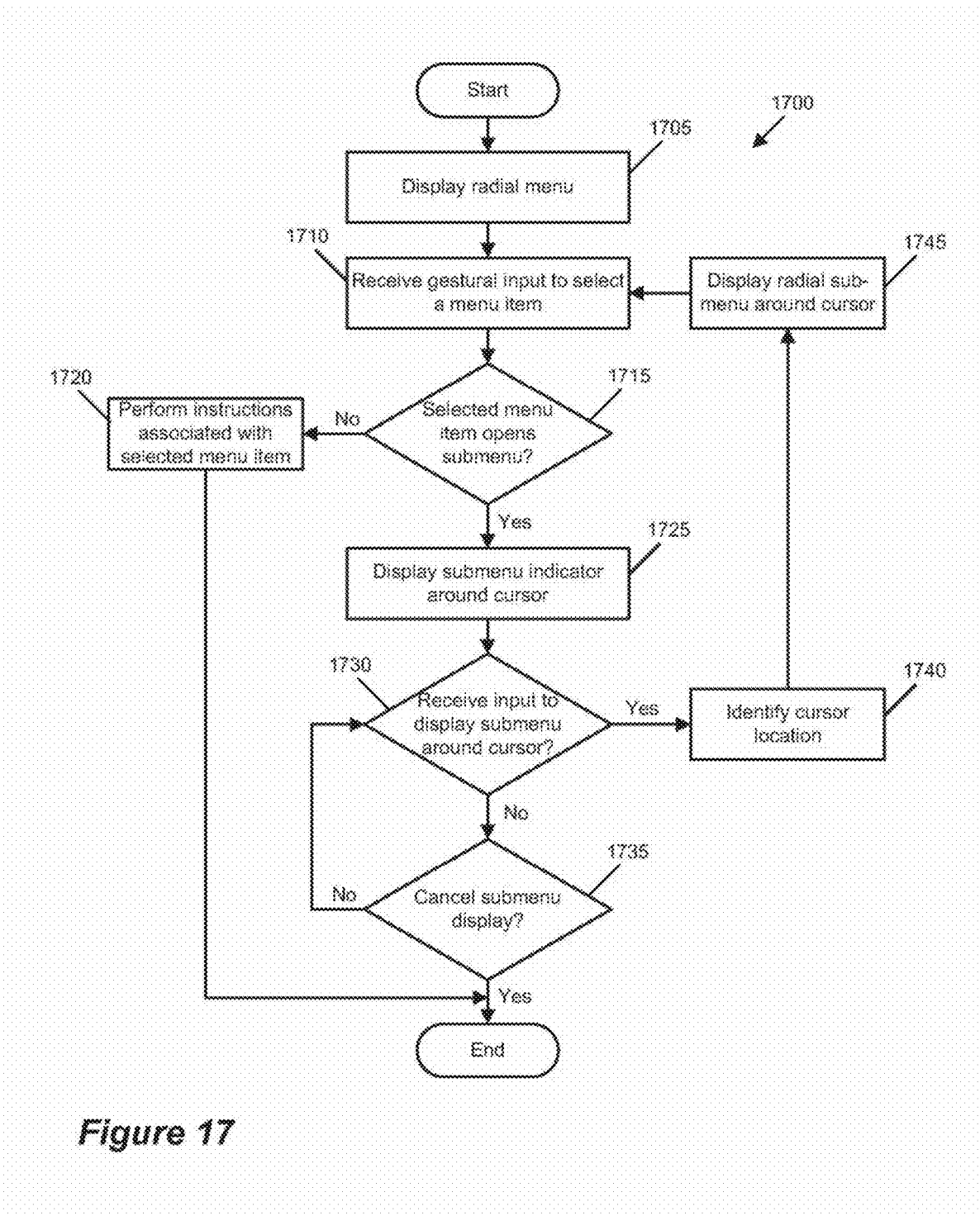
FIG. 17 conceptually illustrates a process of some embodiments for displaying radial menus and sub-menus and receiving selections from the menus.

As mentioned above, in some cases the selected item opens a sub-menu. Some embodiments, after receiving gestural input to open the sub-menu, either do not display the sub-menu or display the sub-menu in a default location until the user provides further input. FIG. 17 conceptually illustrates a process 1700 of some embodiments for displaying radial menus and sub-menus and receiving selections from the menus. FIG. 17 will be described by reference to FIGS. 18-20.

As shown, process 1700 begins by displaying (at 1705) a radial menu. In some embodiments, the radial menu is displayed as a result of a user invoking the radial menu (e.g., through the selection of a single item as illustrated in FIG. 6, above). That is, in some embodiments a user has clicked, tapped, etc. on an item such as item 655 in order to begin the operation of process 1700.

Next, process 1700 receives (at 1710) gestural input to select a menu item. As described above, the gestural input is a sweep gesture in some embodiments that may or may not be accompanied by other input such as a mouse click, a press-and-hold of a mouse button, etc. The gestural input may select an item based on an angle of the cursor movement, where the cursor crosses a particular distance from the center of the menu, or other criteria.

Figure 18:
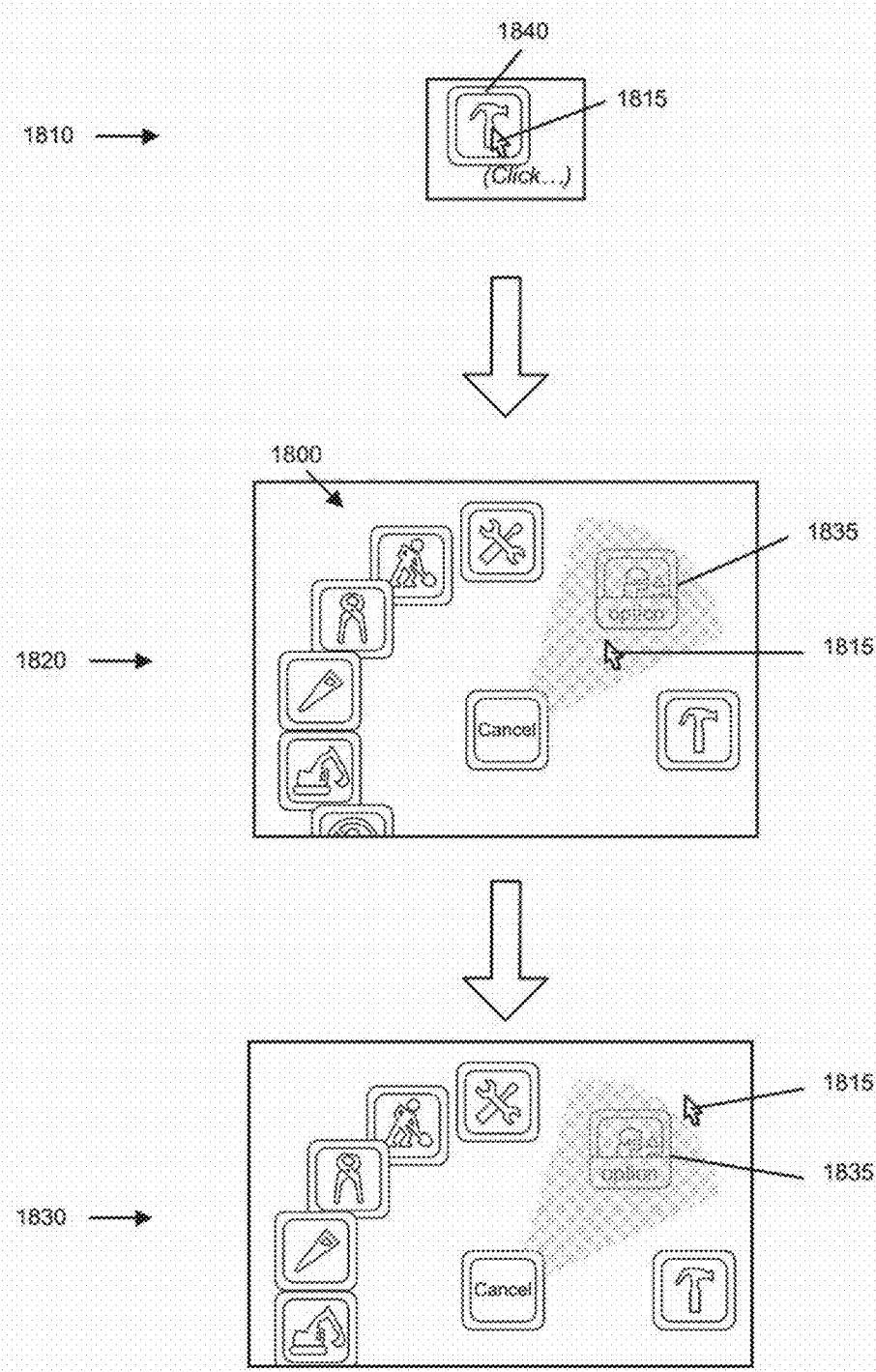
FIG. 18 illustrates the opening of a radial menu due to a click input and a subsequent sweep gesture to select a menu item.

FIG. 18 illustrates the opening of a radial menu 1800 due to a click input and a subsequent sweep gesture to select a menu item 1835. FIG. 18 illustrates this in three stages, a first stage 1810 at which point the user is opening the radial menu, and second and third stages 1820 and 1830 during which the cursor is moving in the sweep gesture.

Stage 1810 illustrates a single selectable menu item 1840. Cursor 1815 is presently over the single selectable menu item 1840 and a user has pressed-and-released a selection button on a cursor controller (as indicated by the "(Click . . . )" text). This causes the invocation and opening of radial menu 1800. Stage 1820 illustrates part of radial menu 1800 after the menu has opened and the user has begun moving the cursor 1815 towards menu item 1835 in a sweep gesture in order to select menu item 1835 via gestural selection. In some embodiments, the radial menu opens as illustrated in FIG. 6, with the menu items expanding outwards. In some such embodiments, when a user is selecting an item via gestural selection, the user need not wait for the menu to fully open before beginning the sweep gesture. That is, stage 1820 could be the very moment when the menu items have arrived at their fully open locations, while the cursor 1815 has been moving along with the menu items due to user interaction.

As shown in FIG. 18, some embodiments highlight the menu item underneath the cursor as the gestural selection is made. In the case where the user begins the sweep gesture before the radial menu is fully open, some embodiments highlight the menu item before the fully open state, while other embodiments do not display a highlight until the menu items are no longer moving. In the case where the user does not begin the sweep gesture in the center of the menu (e.g., the case illustrated in FIG. 16), some embodiments always highlight the menu item underneath the cursor. Other embodiments recognize a sweep gesture after a particular amount of cursor movement, and highlight the menu item selectable based on the angle of the cursor movement.

Stage 1830 of FIG. 18 illustrates that the user has continued moving the cursor, in approximately the same direction, past the radial distance of the menu 1800 at which menu item 1835 is displayed, to select item 1835 via gestural input.

Returning to process 1700, after receiving the gestural input to select a menu item, the process determines (at 1715) whether the selected item opens a sub-menu. As is the case with menu item 1835, the menu items of some embodiments include visual indicators if they open a sub-menu. Item 1835 includes arrows pointing up and down, but other visual indicators are possible (e.g., a plus sign, a single arrow, a number indicating the number of menu items in the sub-menu, etc.). When the selected menu item does not open a sub-menu, the process performs (at 1720) instructions associated with the selected menu item, then ends. These instructions may perform a command (e.g., print a file, etc.) or activate a tool (e.g., a drawing tool, editing tool, etc.).

Figure 19:
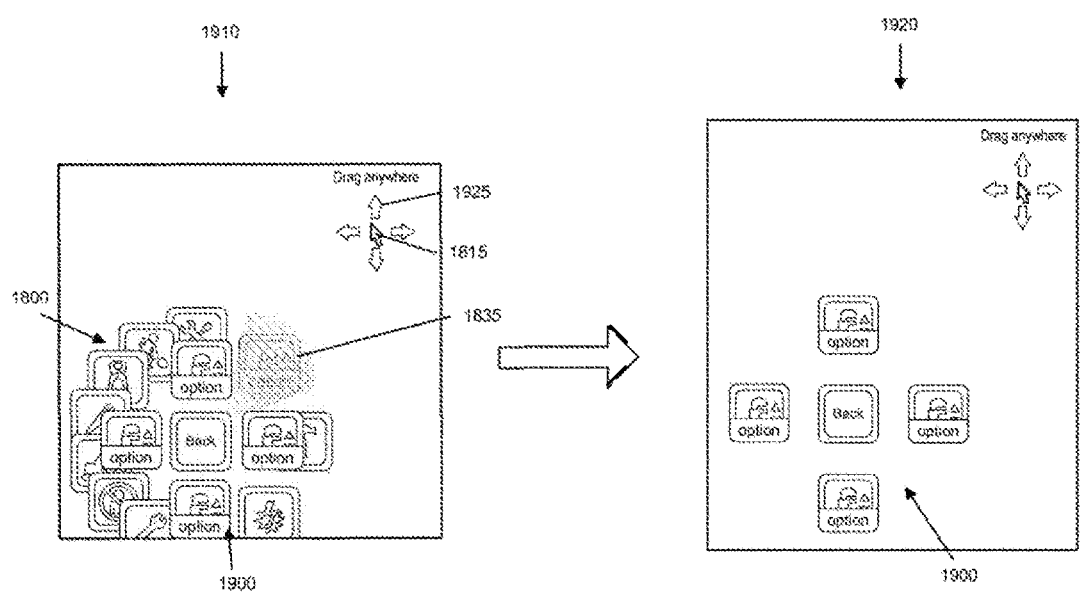
FIG. 19 illustrates the result of the gestural selection of the menu item in FIG. 18.

When the selected menu item does open a sub-menu, the process displays (at 1725) a sub-menu indicator around the cursor. In some embodiments, this is an indicator that clicking will cause a display of the sub-menu around the cursor. FIG. 19 illustrates the result of the gestural selection of menu item 1835 from radial menu 1800 and the initial display of radial sub-menu 1900, via two stages 1910 and 1920. As shown, in addition to displaying the sub-menu indicator around the cursor, some embodiments open the radial sub-menu initially at a default location while waiting for user input to move the sub-menu. Some embodiments initially display the radial sub-menu around the selected item from the parent menu.

Other embodiments initially display the radial sub-menu with the same central location as the parent menu. This is the case illustrated in FIG. 19. Stage 1910 illustrates the GUI shortly after the gestural selection input has been recognized to select item 1835. Radial sub-menu 1900 is partially open at this stage, while parent menu 1800 is partially closed. Some embodiments do not close the parent menu by collapsing the items inwards, but rather the menu either fades or is simply removed from the display. Stage 1910 also illustrates sub-menu indicator 1925 around cursor 1815. Sub-menu indicator 1925 includes the text "Drag anywhere", indicating to the user that the cursor may be moved anywhere. Stage 1920 illustrates radial menu 1900 after it has fully expanded and the parent menu 1800 has fully closed.

Process 1700 next waits for input to display the sub-menu around the cursor. The process determines (at 1730) whether input has been received to display the sub-menu around the cursor. In some embodiments, this is a click input or the equivalent. That is, the sub-menu indicator is displayed around the cursor until a user presses and releases a mouse button, taps a touchpad, etc. When no such input is received, the process determines (at 1735) whether to cancel the sub-menu display. For instance, some embodiments include a timer, and if no input is received after a threshold time (e.g., five seconds) then the menu is canceled and a user must re-invoke the menu in order to select a menu item. Some embodiments also allow keystrokes from a user to cancel a menu, or a particular input from a cursor controller.

Figure 20:
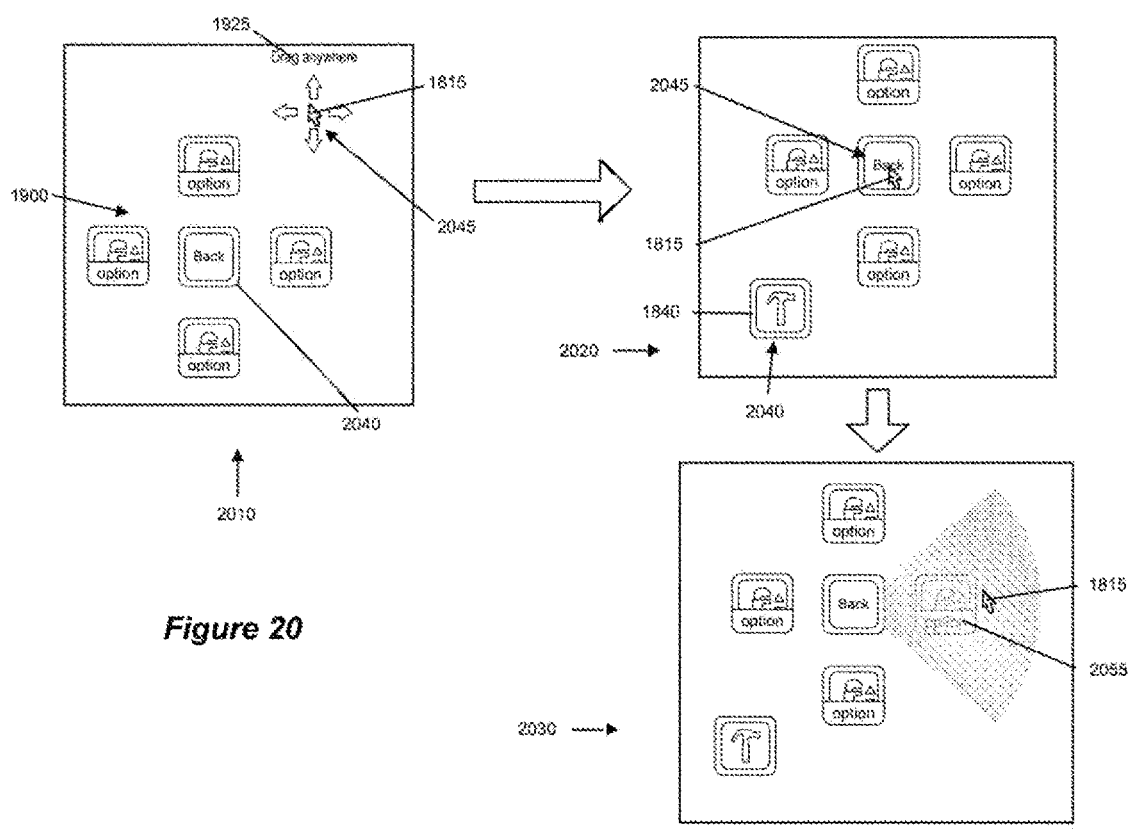
FIG. 20 illustrates the result of user movement to move the radial sub-menu to the cursor location and the subsequent gestural selection of a menu item from the sub-menu.

When the process receives input to display the sub-menu around the cursor (e.g., a mouse click), the process identifies (at 1740) the cursor location and then displays (at 1745) the radial sub-menu around the cursor. The process then returns to 1710 such that a menu item from the sub-menu can be selected via gestural input. FIG. 20 illustrates the result of user input to move the radial sub-menu 1900 to the cursor location and the subsequent gestural selection of a menu item 2055 from the sub-menu. This is illustrated in three stages, 2010-2030. Stage 2010 illustrates the radial sub-menu 1900 centered at a location 2040, and the cursor 1815 with sub-menu indicator 1925 at location 2045.

Stage 2020 illustrates the GUI after click input (or an equivalent) has been received and the radial sub-menu 1900 has moved from location 2040 to location 2045, where cursor 1815 is now located without sub-menu indicator 1925. Some embodiments remove the display of the sub-menu at the default location (e.g., location 2040) and immediately display it at the cursor location (e.g., location 2045). Other embodiments, however, animate the movement of the sub-menu from the default location to the cursor location. Single selectable item 1840 is now displayed at location 2040, which is the same location at which it was displayed initially in FIG. 18. In some embodiments, the sub-menu is essentially displayed on top of the single item after the parent menu has closed underneath the single item. Stage 2030 illustrates the gestural selection of a menu item 2055, as the user moves the cursor to the right.

As mentioned above by reference to FIG. 7, some embodiments resize, move, or relocate menus and sub-menus when they are invoked too close to the edge of the display screen. Accordingly, like the process 700 of FIG. 7, the process 1700 of FIG. 17 in some embodiments determines the location of a menu or sub-menu by first identifying an initial location for positioning the menu or submenu, and then determining whether the initial location would cause some of the menu or sub-menu to be off-screen. When the initial location would have some of the menu or sub-menu off-screen, the process 1700 in these embodiments resizes, moves, and/or relocates menus and sub-menus to ensure that it appears completely on the display screen.

One of ordinary skill in the art will recognize that the above process 1700 is an example of one possible process performed by some embodiments to receive gestural selections from sub-menus. Process 1700 is not necessarily the only example of how computer instructions can display such a menu and translate input for the menu, and some embodiments perform variations of process 1700. For instance, some embodiments, after displaying a radial sub-menu around the cursor, can receive click input in addition to gestural input in order to select a menu item, or could receive click input to select a menu cancellation button. Furthermore, the operations of process 1700 may, in some embodiments, be performed by multiple processes. For instance, multiple different processes may be involved in the performance of operation 1710 in order to recognize gestural input and associate the input with a menu item. In addition, once a radial sub-menu is displayed, a completely separate process may be used to translate input regarding the sub-menu.

IV. Uses of Menus

As discussed, the various radial menus described above can be used in a wide variety of computing applications. The menus can be used directly in an operating system or in an application separate from the operating system in some embodiments. Furthermore, the menus can be especially useful in handheld devices such as the iPhone®.

Figure 21:
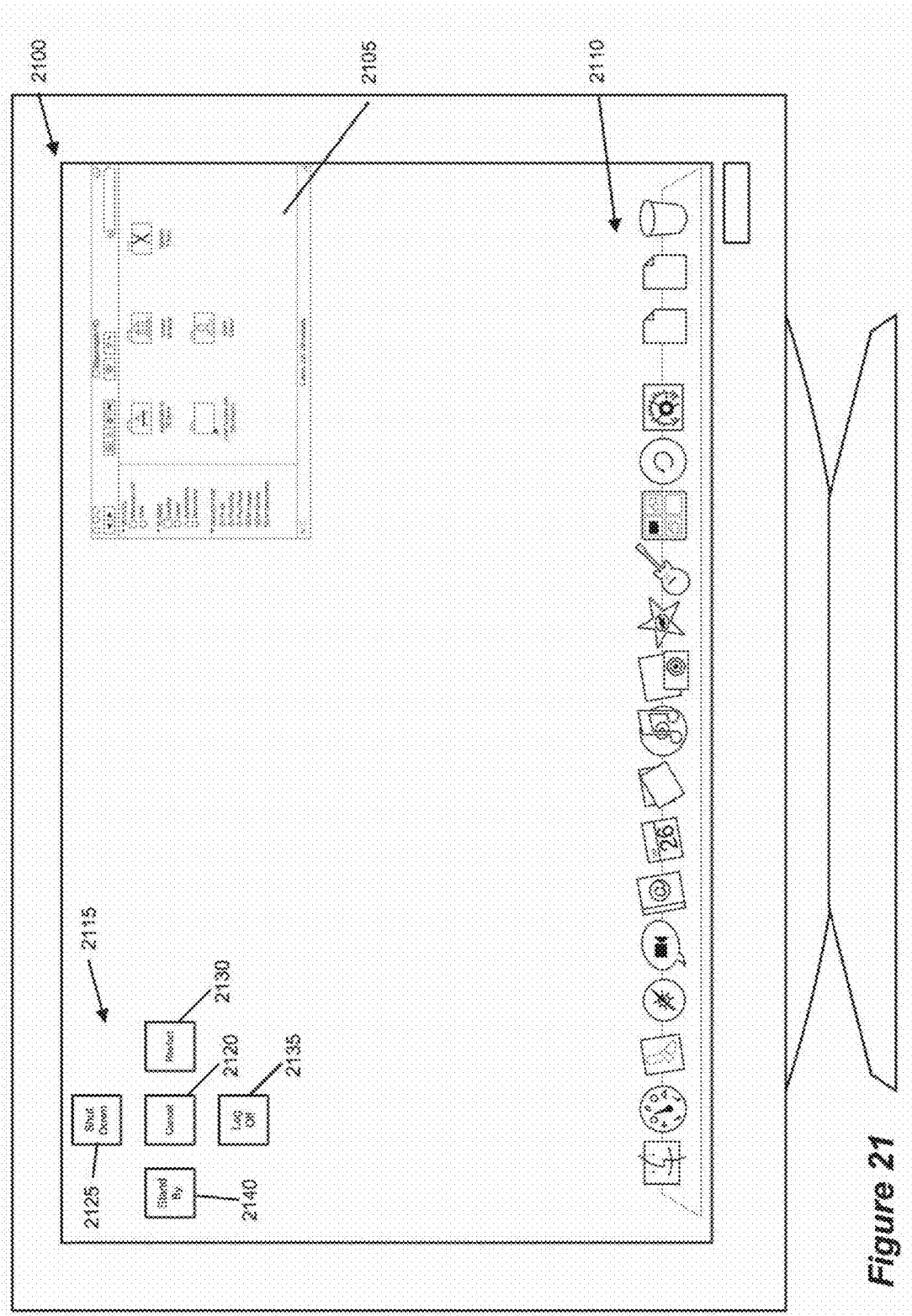
FIG. 21 illustrates a computer desktop displaying various features of an operating system, including the radial menus of some embodiments.

FIG. 21 illustrates a computer desktop 2100 displaying various features of an operating system of some embodiments. The desktop includes a file folder navigation window 2105, application selection icons 2110, and radial menu 2115. The file folder navigation window 2105 is a standard window that enables a user to navigate a hierarchical file system in order to find and open a file (e.g., a word processing document, a spreadsheet, a video file, etc.). The application selection icons 2110 provide easy access for a user to the different applications (e.g., e-mail, web browsers, media players, word processing applications, media-editing applications, etc.) on the computing device.

Radial menu 2115 is one example of the use of the menus described above for providing operating system features. Radial menu 2115 presents various options related to shutting off the computer. Radial menu 2115 includes a menu cancellation button 2120 and four menu items 2125-2140. Item 2125 presents a "Shut Down" option, item 2130 presents a "Restart" option, item 2135 presents a "Log Off" option, and item 2140 presents a "Standby" option. Some embodiments also include other options such as hibernating.

The menu items 2125-2140 are evenly spaced around the radial menu. However, some embodiments assign higher priorities, and thus a larger angular range, to some of the menu items. For instance, many users will use the "Shut Down" option more often than the other items, and thus it would have a larger angular range.

In some embodiments, radial menu 2115 is not permanently displayed as part of the desktop. Instead, a single selectable item (e.g., menu item 2125) is normally displayed in the desktop 2100 and a user can invoke the radial menu by selecting the single menu item. Other items (e.g., windows such as window 2105) may be placed on top of the single selectable item if a user wishes to make use of the screen real estate where the item is located.

One of ordinary skill in the art will recognize that the radial menus of some embodiments may be used for a wide variety of operating system features. As an example, the application selection icons could be integrated into a menu such as radial menu 2115 or one of the other menus described above. For instance, the application selection icons could be provided in a radial menu that is displayed in one corner of the screen rather than taking up the entire bottom portion of the screen. Similarly, the file system could be implemented as a set of radial menus and sub-menus representing folders and sub-folders.

Figure 22:
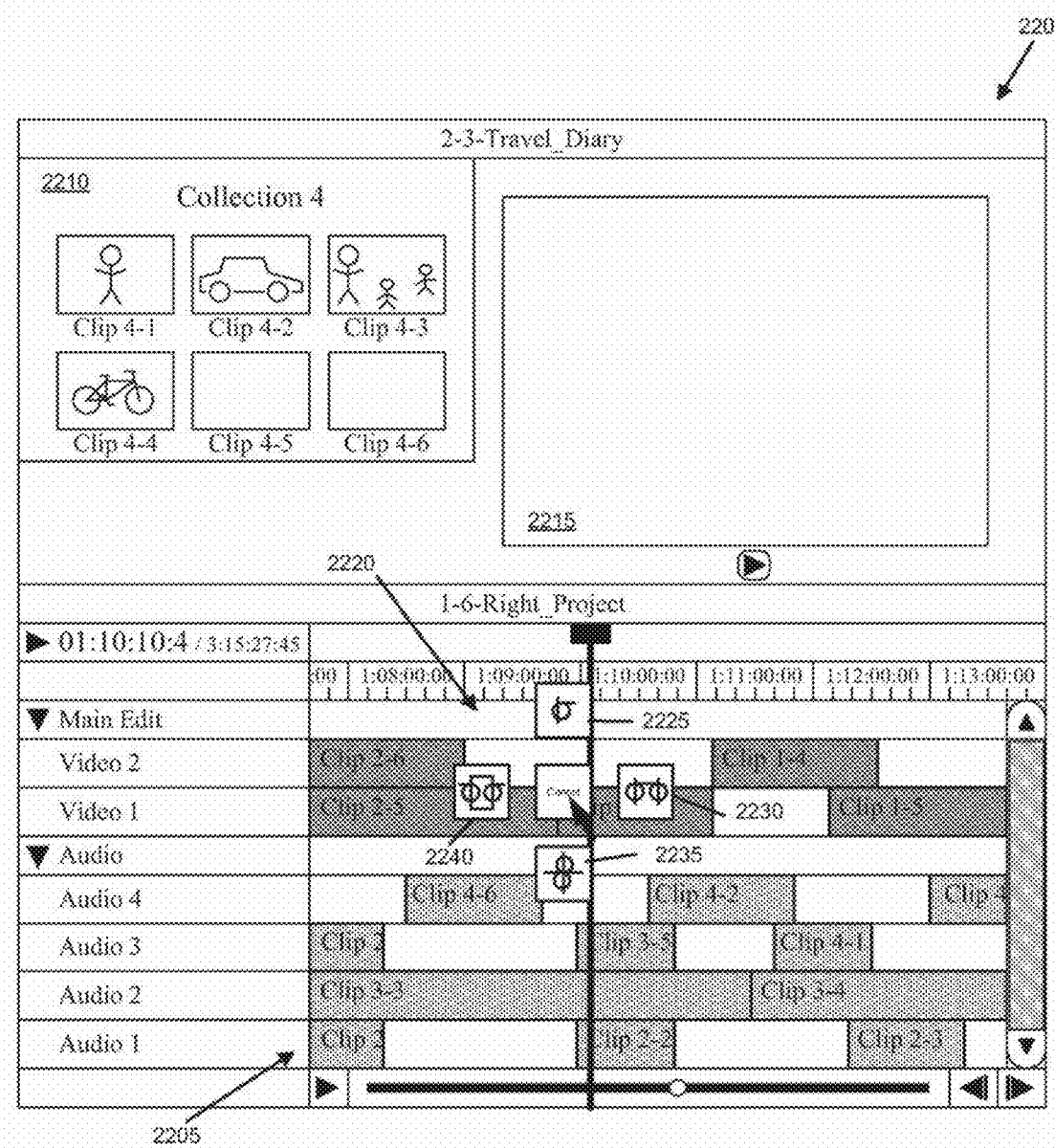
FIG. 22 illustrates a video-editing application that utilizes the radial menus of some embodiments.

FIG. 22 illustrates a video-editing application 2200 that is used to create composite video presentations and that utilizes the menus of some embodiments. Video-editing application 2200 includes a composite display area 2205, a set of selectable video clips 2210, video preview display area 2215, and a video-editing radial menu 2220.

The composite display area 2205 provides a visual representation of the video presentation that the user creates. Users can add media clips (e.g., audio and video clips) to the composite display area, where the clips are graphically represented. A user can modify the video presentation by performing editing operations on the clips in the composite display area. The set of selectable video clips 2210 provides various media clips, represented as thumbnails, that the user can select and add to the video presentation via the composite display area 2205. The video preview display area 2215 displays a preview of the composite presentation according to the composite display area.

The video-editing radial menu 2220 is an example of the use of the menus described above for providing video-editing tools. Specifically, radial menu 2220 provides the user with multiple trimming tool options. Radial menu 2220 includes slip tool 2225, roll tool 2230, slide tool 2235, and ripple tool 2240. Some embodiments present radial menus with more of less video-editing tools (e.g., tools other than trimming tools). Some embodiments include multiple different radial menus that a user can invoke in different ways.

The video-editing radial menu 2220 is not permanently displayed over the composite display area in some embodiments. Rather, a user invokes the radial menu when they want to perform a trim edit. In some embodiments, the menu is invoked via a keyboard shortcut. Some embodiments respond to click input when the cursor is over the composite display area by displaying the radial menu. The order or priority of the menu items may be determined by which trim tool the user is most likely to choose based on where the cursor is located relative to the edit points of the video clips in the composite display area.

Figure 23:
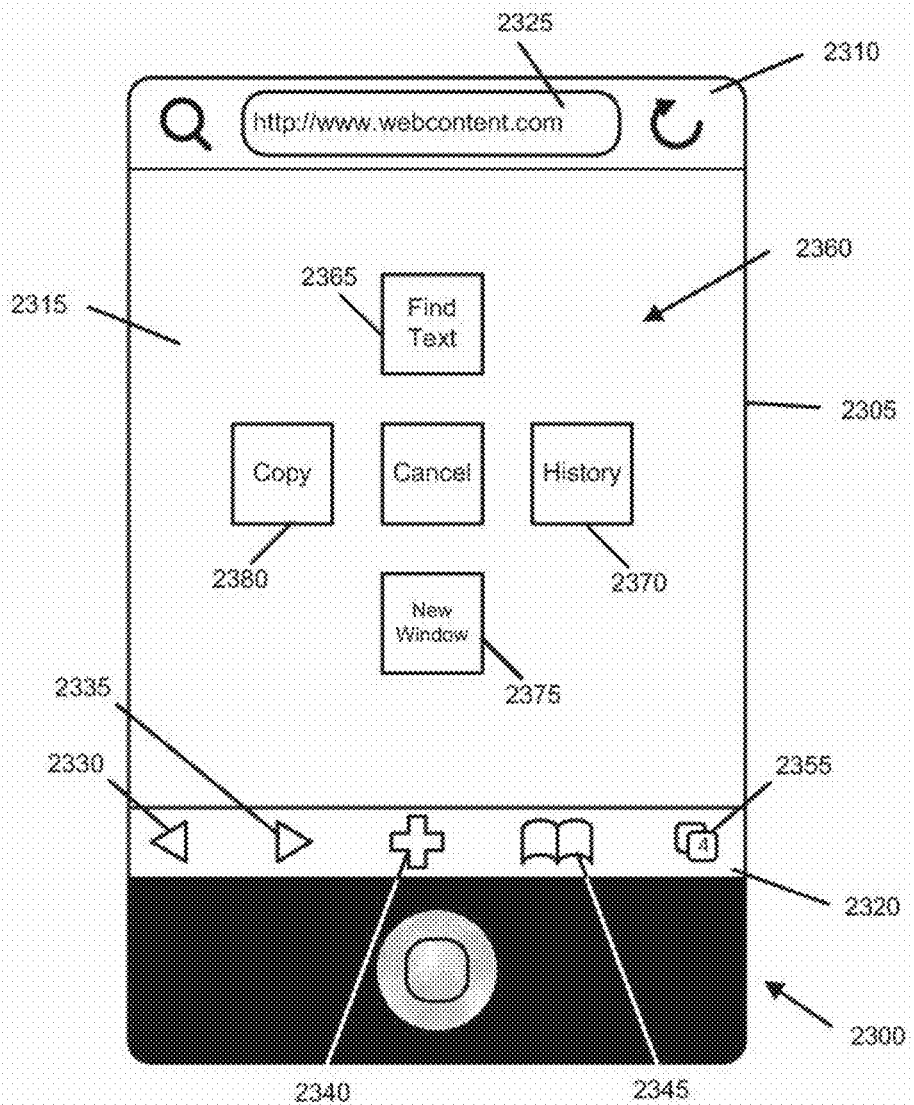
FIG. 23 illustrates a handheld device that is displaying a web browser using the radial menus of some embodiments.

FIG. 23 illustrates a handheld device 2300 that is presently displaying a web browser 2305. Device 2300 could be a cell phone, a media player, etc. Web browser 2305 includes a uniform resource locator (URL) toolbar 2310, a content display area 2315, a toolbar 2320, and a radial menu 2360.

The URL bar 2310 includes user interface tools and an address bar 2325 in which a user can type a URL and which displays a URL of a website to which a user has navigated by clicking on links within content display area 2315. Content display area 2315 displays the web page located at the URL indicated in address bar 2325.

Toolbar 2320 includes five tools—back and forward buttons 2330 and 2335, an add bookmark icon 2340, a bookmarks icon 2345 for opening a list of bookmarks, and a page gallery icon 2355 for displaying a list of open web pages for the user to choose from.

Radial menu 2360 presents various options that are not permanently displayed in URL bar 2310 or toolbar 2320.

Radial menu 2360 includes a find text option 2365 for bringing up a tool that allows a user to type in text to find in the content displayed in display area 2315, a history option 2370 for allowing a user to view their browsing history, a new window option 2375 for opening a new browsing window and a copy option 2380 for copying text.

In some embodiments, the device is a touchscreen device. A user can invoke the menu by a tap, double-tap, or other multi-touch input in the display area 2315 in some embodiments. In order to select one of the radial menu items, a user can tap the menu item or perform a swipe gesture in the direction of the menu item (i.e., the touchscreen equivalent to a sweep gesture).

One of ordinary skill will recognize that radial menus other than menu 2360 are possible for use in a handheld device browser. For instance, the toolbar 2320 could be presented as an invocable radial with five items. Furthermore, such menus are not restricted in any way to browsers, and in fact could be used for any application on a handheld device. Screen space is often at a premium in handheld devices such as device 2300, so the menus described in this application are an ideal solution for providing numerous options in this limited space.

V. Software Architecture

Figure 24:
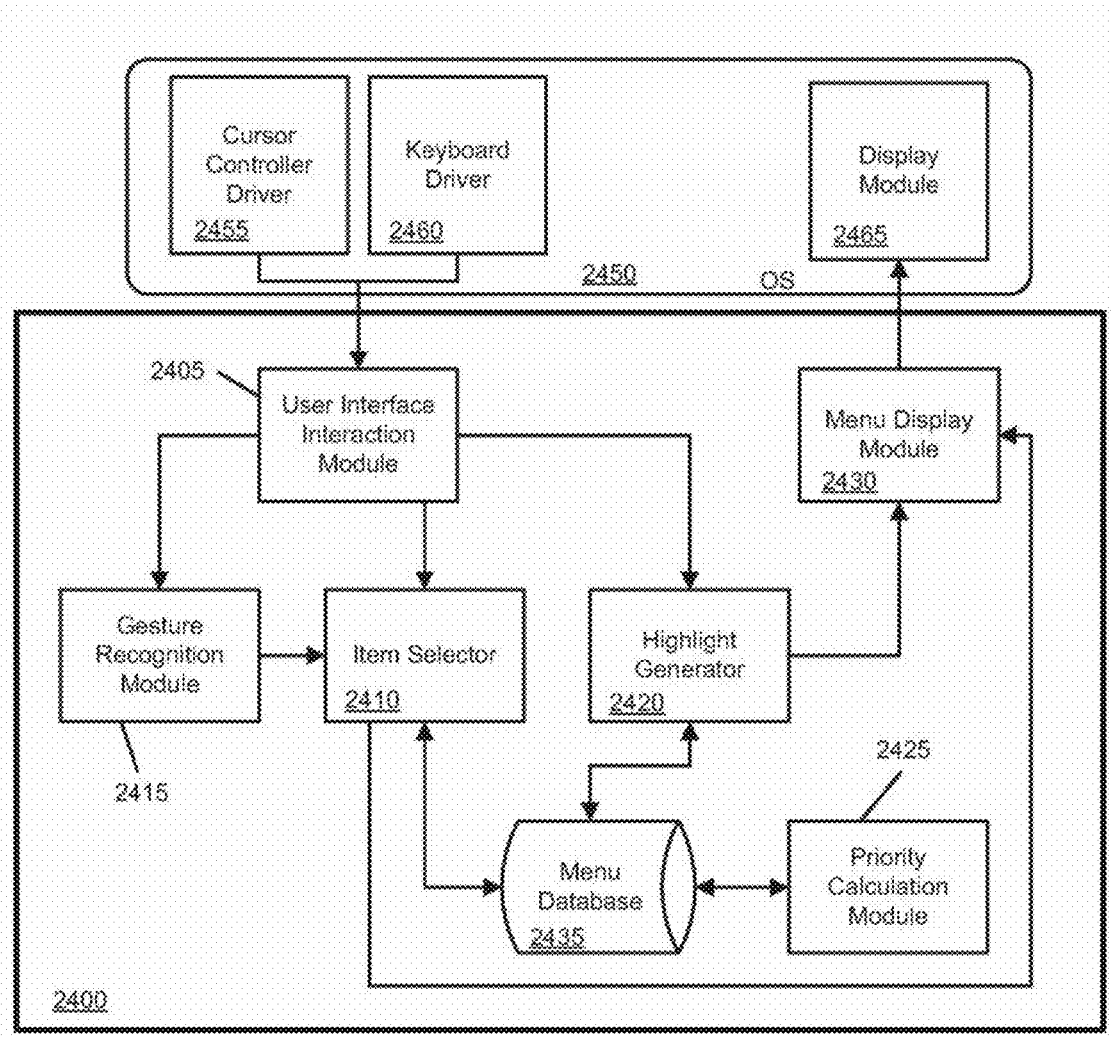
FIG. 24 conceptually illustrates the software architecture of an application of some embodiments for presenting radial menus.

In some embodiments, the processes described above are implemented as software running on a particular machine, such as a computer or a handheld device, or stored in a computer readable medium. FIG. 24 conceptually illustrates the software architecture of an application 2400 of some embodiments for presenting menus such as those described in the preceding sections. In some embodiments, the application is a stand-alone application or is integrated into another application (for instance, application 2400 might be a portion of a video-editing application, software for a handheld device, etc.), while in other embodiments the application might be implemented within an operating system. Furthermore, in some embodiments, the application is provided as part of a server-based solution. In some such embodiments, the application is provided via a thin client. That is, the application runs on a server while a user interacts with the application via a separate machine remote from the server. In other such embodiments, the application is provided via a thick client. That is, the application is distributed from the server to the client machine and runs on the client machine.

Application 2400 includes a user interface (UI) interaction module 2405, an item selector 2410, a gesture recognition module 2415, a highlight generator 2420, a priority calculation module 2425, and a menu display module 2430. The media-editing application also includes menu database 2435. In some embodiments, other storages are present as well, which may be part of the same physical storage as menu database 2435 or stored separately. FIG. 24 also illustrates an operating system 2450 that includes cursor controller driver 2455, keyboard driver 2460, and display module 2465. In some embodiments, as illustrated, the cursor controller driver 2455, keyboard driver 2460, and display module 2465 are part of the operating system 2450 even when the application 2400 is an application or part of an application separate from the operating system.

A user interacts with the user interface via input devices (not shown). The input devices, such as cursor controllers (mouse, tablet, touchpad, etc.) and keyboards, send signals to the cursor controller driver 2455 and keyboard driver 2460, which translate those signals into user input data that is provided to the UI interaction module 2405.

The present application describes a graphical user interface that provides users with numerous ways to perform different sets of operations and functionalities. In some embodiments, these operations and functionalities are performed based on different commands that are received from users through different input devices (e.g., keyboard, trackpad, touchpad, mouse, etc). For example, the present application describes the use of a cursor in the graphical user interface to control (e.g., select, move) objects in the graphical user interface. However, in some embodiments, objects in the graphical user interface can also be controlled or manipulated through other controls, such as touch control. In some embodiments, touch control is implemented through an input device that can detect the presence and location of touch on a display of the device. An example of such a device is a touch screen device. In some embodiments, with touch control, a user can directly manipulate objects by interacting with the graphical user interface that is displayed on the display of the touch screen device. For instance, a user can select a particular object in the graphical user interface by simply touching that particular object on the display of the touch screen device. As such, when touch control is utilized, a cursor may not even be displayed for enabling selection of an object of a graphical user interface in some embodiments. However, when a cursor is provided in a graphical user interface, touch control can be used to control the cursor in some embodiments.

The UI interaction module interprets the user input data in the context of the presented radial menus and passes it to the appropriate modules, such as the item selector 2410, gesture recognition module 2415, and highlight generator 2420.

The item selector 2410 interprets user interface interactions into the selection of radial menu items. When the radial menu is opened via the selection of a single selectable item, this selection is handled by the item selector 2410 as well. The item selector receives information from the menu database 2435, such as which items are in a radial menu that is to be opened, where the items are located, the angular regions associated with the items, etc. The item selector also receives gesture information from the gesture recognition module 2415 when a gestural selection is identified. Information regarding the selection of menu items and any associated information from the menu database 2435 is then passed to the menu display module for interpretation and output. In some embodiments, the item selector 2410 also recognizes selection input for moving a radial sub-menu to a cursor location, as described in Section III above.

The gesture recognition module 2415 interprets user interface interaction information that is received from the UI interaction module 2405 to determine whether cursor input is a gestural selection. The gesture recognition module 2415 performs calculations on cursor position data over time to determine whether the cursor is moving fast and straight enough for a gestural selection and if so, the angle and location of the gesture. This gesture information (angle, cursor location, etc.) is passed to the item selector 2410 so that the item selector can identify the menu item selected by the gesture.

The highlight generator 2420 generates a highlight for a radial menu item based on the cursor location. In some embodiments, the highlight generator identifies a cursor location based on information received from the UI interaction module 2405, associates that with a particular menu item, and generates the highlight for the entire range of angles associated with the particular menu item. This information is then passed to the menu display module 2430 so that the highlight can be displayed.

The priority calculation module 2425 calculates the different priorities for the various menu items that are part of the radial menus in the menu database 2435. In some embodiments, the menu database keeps track of the frequency of selection for the various menu items (in other embodiments, this information is stored in a separate storage). This frequency of selection information is used by the priority calculation module of some embodiments to determine the priorities for the various menu items. The priority calculation module, in some embodiments, also calculates the angular ranges for the various menu items in the menu database 2435. Some embodiments calculate this information on a regular basis, or after a selection of a menu item is made. Other embodiments calculate this information whenever a radial menu is invoked.

The menu display module 2430 receives information from the item selector 2410 and the highlight generator 2420. The menu display module 2430 controls the display of the menu items. In some embodiments, the menu display module handles the opening and closing of the menus in response to item selection, including any submenus. This information is sent to display module 2465, which handles the actual display of the menus (and the rest of the graphical user interface) on an output device (not shown).

While many of the features have been described as being performed by one module (e.g., the item selector 2410 or gesture recognition module 2415), one of ordinary skill would recognize that the functions might be split up into multiple modules, and the performance of one feature might even require multiple modules. Similarly, multiple features that are described as being performed by multiple modules might in fact be performed by a single module. In some embodiments, each module is a set of processes.

Figure 25:
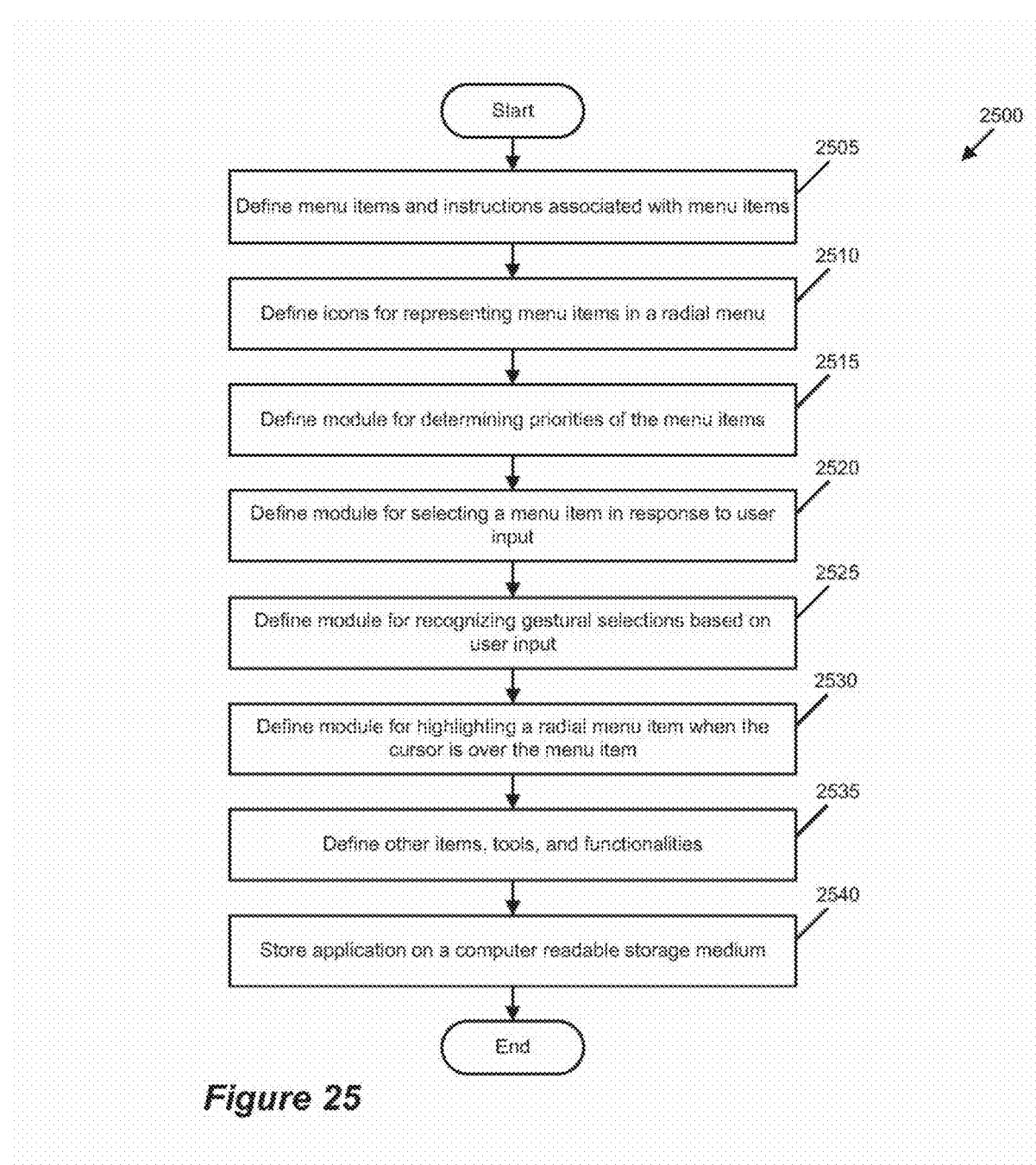
FIG. 25 conceptually illustrates a process of some embodiments for manufacturing an application.

FIG. 25 conceptually illustrates a process 2500 of some embodiments for manufacturing an application (e.g., a video-editing application, an operating system, etc.). As shown, process 2500 begins by defining (at 2505) menu items and instructions associated with the menu items. The process then defines (at 2510) icons for representing the menu items in a radial menu. The menu items and associated icons of menu 600 illustrated in FIG. 6 are examples of such items.

Next, process 2500 defines (at 2515) a module for determining priorities of the menu item, such as the priority calculation module 2425 of application 2400. The process defines (at 2520) a module for selecting a menu item in response to user input. Item selector 2410 is an example of such a module. The process next defines (at 2525) a module for recognizing gestural selections based on user input, such as the gesture recognition module 2415.

Process 2500 then defines (at 2530) a module for highlighting a radial menu item when the cursor is over the menu item, such as highlight generator 2420. Next, the process defines (at 2535) other items, tools, and functionalities. For instance, if the application being defined is an operating system, the process defines the various functionalities necessary for the operating system. When the application being defined is a media-editing application, various editing tools, GUI constructs, etc. are defined.

Process 2500 next stores (at 2540) the defined application on a computer readable storage medium. The computer readable storage medium may be a disk (e.g., CD, DVD, hard disk, etc.) or a solid-state storage device (e.g., flash memory) in some embodiments. One of ordinary skill in the art will recognize that the various modules and UI items defined by process 2500 are not exhaustive of the modules and UI items that could be defined and stored on a computer readable storage medium for an editing application incorporating some embodiments of the invention.

VI. Computer System

Many of the above-described features and applications are implemented as software processes that are specified as a set of instructions recorded on a computer readable storage medium (also referred to as computer readable medium). When these instructions are executed by one or more computational element(s) (such as processors or other computational elements like ASICs and FPGAs), they cause the computational element(s) to perform the actions indicated in the instructions. Computer is meant in its broadest sense, and can include any electronic device with a processor. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs when installed to operate on one or more computer systems define one or more specific machine implementations that execute and perform the operations of the software programs.

Figure 26:
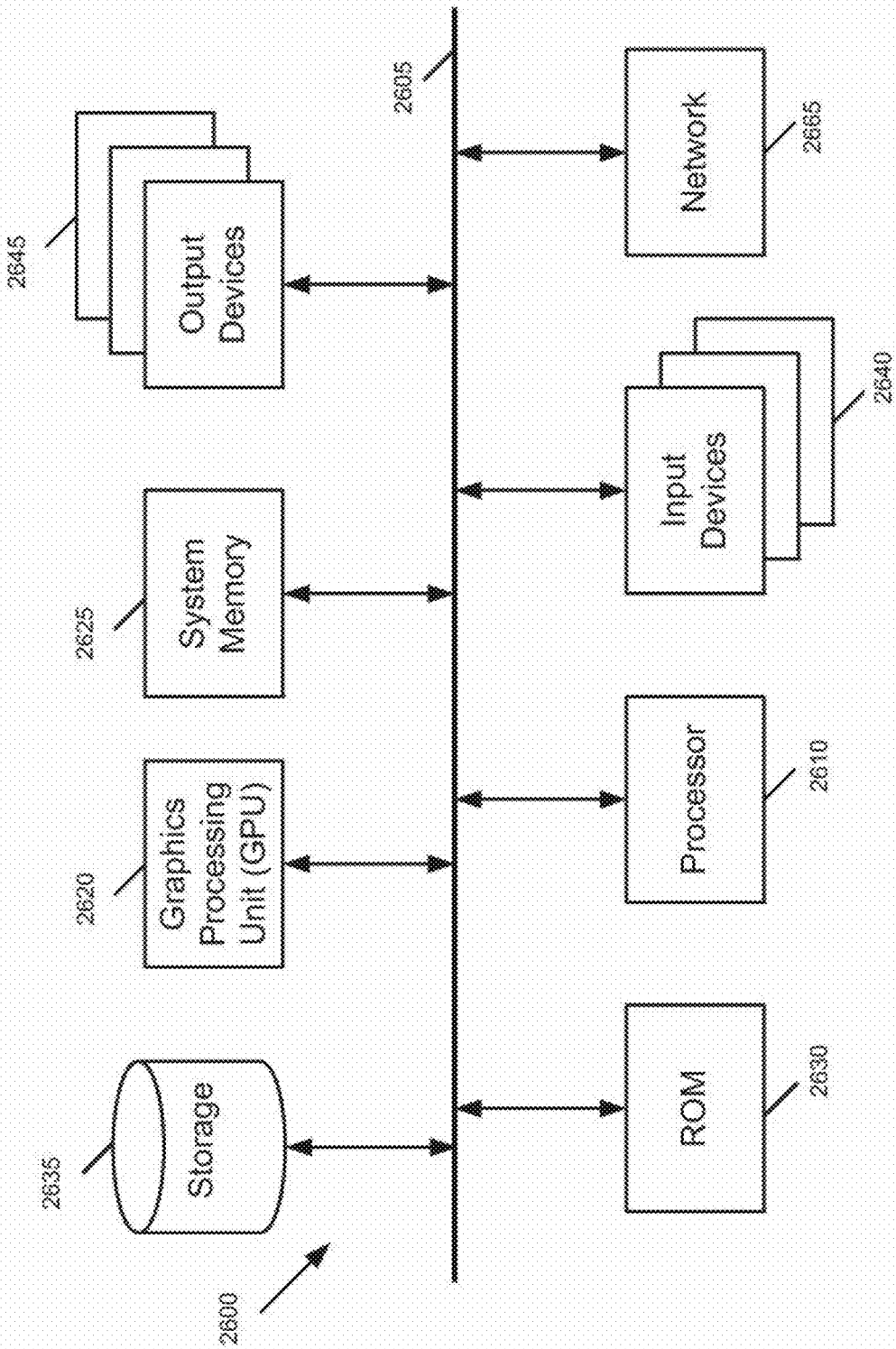
FIG. 26 conceptually illustrates a computer system with which some embodiments of the invention are illustrated.

FIG. 26 conceptually illustrates a computer system with which some embodiments of the invention are implemented. Such a computer system includes various types of computer readable media and interfaces for various other types of computer readable media. Computer system 2600 includes a bus 2605, a processor 2610, a graphics processing unit (GPU) 2620, a system memory 2625, a read-only memory 2630, a permanent storage device 2635, input devices 2640, and output devices 2645.

The bus 2605 collectively represents all system, peripheral, and chipset buses that communicatively connect the numerous internal devices of the computer system 2600. For instance, the bus 2605 communicatively connects the processor 2610 with the read-only memory 2630, the GPU 2620, the system memory 2625, and the permanent storage device 2635.

From these various memory units, the processor 2610 retrieves instructions to execute and data to process in order to execute the processes of the invention. In some embodiments, the processor comprises a Field Programmable Gate Array (FPGA), an ASIC, or various other electronic components for executing instructions. In some embodiments, the processor Some instructions are passed to and executed by the GPU 2620. The GPU 2620 can offload various computations or complement the image processing provided by the processor 2610. In some embodiments, such functionality can be provided using CoreImage's kernel shading language.

The read-only-memory (ROM) 2630 stores static data and instructions that are needed by the processor 2610 and other modules of the computer system. The permanent storage device 2635, on the other hand, is a read-and-write memory device. This device is a non-volatile memory unit that stores instructions and data even when the computer system 2600 is off. Some embodiments of the invention use a mass-storage device (such as a magnetic or optical disk and its corresponding disk drive) as the permanent storage device 2635.

Other embodiments use a removable storage device (such as a floppy disk, flash drive, or ZIP® disk, and its corresponding disk drive) as the permanent storage device. Like the permanent storage device 2635, the system memory 2625 is a read-and-write memory device. However, unlike storage device 2635, the system memory is a volatile read-and-write memory, such a random access memory. The system memory stores some of the instructions and data that the processor needs at runtime. In some embodiments, the invention's processes are stored in the system memory 2625, the permanent storage device 2635, and/or the read-only memory 2630. For example, the various memory units include instructions for processing multimedia items in accordance with some embodiments. From these various memory units, the processor 2610 retrieves instructions to execute and data to process in order to execute the processes of some embodiments.

The bus 2605 also connects to the input and output devices 2640 and 2645. The input devices enable the user to communicate information and select commands to the computer system. The input devices 2640 include alphanumeric keyboards and pointing devices (also called "cursor control devices"). The output devices 2645 display images generated by the computer system. For instance, these devices display a GUI. The output devices include printers and display devices, such as cathode ray tubes (CRT) or liquid crystal displays (LCD).

Finally, as shown in FIG. 26, bus 2605 also couples computer 2600 to a network 2665 through a network adapter (not shown). In this manner, the computer can be a part of a network of computers (such as a local area network ("LAN"), a wide area network ("WAN"), or an Intranet, or a network of networks, such as the internet. For example, the computer 2600 may be coupled to a web server (network 2665) so that a web browser executing on the computer 2600 can interact with the web server as a user interacts with a GUI that operates in the web browser.

Any or all components of computer system 2600 may be used in conjunction with the invention. For instance, in some embodiments the execution of the frames of the rendering is performed by the GPU 2620 instead of the processor 2610. Similarly, other image editing functions can be offloaded to the GPU 2620 where they are executed before the results are passed back into memory or the processor 2610. However, a common limitation of the GPU 2620 is the number of instructions that the GPU 2620 is able to store and process at any given time. Therefore, some embodiments adapt instructions for implementing processes so that these processes fit onto the instruction buffer of the GPU 2620 for execution locally on the GPU 2620. Additionally, some GPUs 2620 do not contain sufficient processing resources to execute the processes of some embodiments and therefore the processor 2610 executes the instructions. One of ordinary skill in the art would appreciate that any other system configuration may also be used in conjunction with the present invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable blu-ray discs, ultra density optical discs, any other optical or magnetic media, and floppy disks. The computer-readable media may store a computer program that is executable by at least one processor and includes sets of instructions for performing various operations. Examples of hardware devices configured to store and execute sets of instructions include, but are not limited to application specific integrated circuits (ASICs), field programmable gate arrays (FPGA), programmable logic devices (PLDs), ROM, and RAM devices. Examples of computer programs or computer code include machine code, such as is produced by a compiler, and files including higher-level code that are executed by a computer, an electronic component, or a microprocessor using an interpreter.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals. However, some embodiments are implemented as instructions that are implemented as software processes that are specified as a set of instructions sent over a signal carrying medium (e.g., wireless signals, wired download signals, etc.).

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

I claim:

1. A method, comprising:
   at an electronic device with a touch sensitive surface:
   displaying a radial menu including a plurality of selectable menu items including a first selectable menu item and a second selectable menu item arranged about a center location, wherein the first selectable menu item is associated with a first angular range that encompasses the first selectable menu item and the second selectable menu item is associated with a second angular range that encompasses the second selectable menu item;
   displaying a menu cancellation button at the center location of the radial menu, wherein the menu cancellation button is selectable to close the radial menu;
   receiving a gestural input, wherein the gestural input comprises a swipe on the touch sensitive surface; and
   in response to receiving the gestural input:
   in accordance with a determination that a first item selection criteria has been met selecting the first selectable menu item and removing the second selectable menu item from the display while maintaining display of one or more menu items corresponding to the first menu item on the display, wherein the first item selection criteria includes detecting that the gestural input is in a direction that is consistent with the first angular range; and in accordance with a determination that a second item selection criteria has been met selecting the second selectable menu item and removing the first selectable menu item from the display while maintaining display of one or more menu items corresponding to the second menu item on the display, wherein the second item selection criteria includes detecting that the gestural input is in a direction that is consistent with the second angular range.

2. The method of claim 1, wherein the plurality of selectable menu items are positioned within four equally-sized quadrants associated with the radial menu, and further wherein the first selectable menu item is positioned within a first quadrant of the four equally-sized quadrants and the second selectable menu item is positioned within a second quadrant of the four equally-sized quadrants.

3. The method of claim 1, wherein the first and the second item selection criteria further includes a threshold distance of movement from a start point of the gestural input.

4. The method of claim 1, further comprising:
in response to receiving the gestural input:
in accordance with a determination that the gestural input is in a direction that is consistent with the first angular range, highlighting the first selectable menu item; and
in accordance with a determination that the gestural input is in a direction that is consistent the second angular range, highlighting the second selectable menu item.

5. The method of claim 4, wherein highlighting the first selectable menu item includes highlighting a first portion of the radial menu corresponding to the first angular range, and further wherein highlighting of the second selectable menu item includes highlighting a second portion of the radial menu corresponding to the second angular range.

6. The method of claim 5, wherein highlighting the first or the second selectable menu item includes highlighting in a portion of the radial menu that extends to an edge of a display area of the electronic device.

7. The method of claim 1, further comprising:
in response to selecting of one of the plurality of selectable menu items, removing the plurality of selectable menu items from display; and
presenting a radial sub-menu as a set of selectable sub-menu items.

8. The method of claim 1, wherein the gestural input comprises swiping outward from the center location of the radial menu towards one of the plurality of selectable menu items.

9. The method of claim 1, wherein the gestural input comprises swiping in an angular range encompassing one of the plurality of selectable menu items in the radial menu, wherein a starting point of the gestural input does not correspond to the center location of the radial menu.

10. A non-transitory computer readable medium storing a computer program which when executed by at least one processor presents a radial menu, the computer program comprising sets of instructions for:
displaying a radial menu including a plurality of selectable menu items including a first selectable menu item and a second selectable menu item arranged about a center location, wherein the first selectable menu item is associated with a first angular range that encompasses the first selectable menu item and the second selectable menu item is associated with a second angular range that encompasses the second selectable menu item;
displaying a menu cancellation button at the center location of the radial menu, wherein the menu cancellation button is selectable to close the radial menu;
receiving a gestural input, wherein the gestural input comprises a swipe on the touch sensitive surface; and
in response to receiving the gestural input:
in accordance with a determination that a first item selection criteria has been met selecting the first selectable menu item and removing the second selectable menu item from the display while maintaining display of one or more menu items corresponding to the first menu item on the display, wherein the first item selection criteria includes detecting that the gestural input is in a direction that is consistent with the first angular range; and
in accordance with a determination that a second item selection criteria has been met selecting the second selectable menu item and removing the first selectable menu item from the display while maintaining display of one or more menu items corresponding to the second menu item on the display, wherein the second item selection criteria includes detecting that the gestural input is in a direction that is consistent with the second angular range.

11. The non-transitory computer readable medium of claim 10, wherein the plurality of selectable menu items are positioned within four equally-sized quadrants associated with the radial menu, and further wherein the first selectable menu item is positioned within a first quadrant of the four equally-sized quadrants and the second selectable menu item is positioned within a second quadrant of the four equally-sized quadrants.

12. The non-transitory computer readable medium of claim 10, wherein the first and the second item selection criteria further includes a threshold distance of movement from a start point of the gestural input.

13. The non-transitory computer readable medium of claim 10, further comprising sets of instructions for:
in response to receiving the gestural input:
in accordance with a determination that the gestural input is in a direction that is consistent with the first angular range, highlighting the first selectable menu item; and
in accordance with a determination that the gestural input is in a direction that is consistent with the second angular range, highlighting the second selectable menu item.

14. The non-transitory computer readable medium of claim 13, wherein highlighting the first selectable menu item includes highlighting a first portion of the radial menu corresponding to the first angular range, and further wherein highlighting of the second selectable menu item includes highlighting a second portion of the radial menu corresponding to the second angular range.

15. The non-transitory computer readable medium of claim 14, wherein highlighting the first or the second selectable menu item includes highlighting in a portion of the radial menu that extends to an edge of a display area.

16. The non-transitory computer readable medium of claim 10, further comprising sets of instructions for:

in response to selecting of one of the plurality of selectable menu items, removing the plurality of selectable menu items from display; and presenting a radial sub-menu as a set of selectable sub-menu items.

17. The non-transitory computer readable medium of claim 10, wherein the gestural input comprises swiping outward from the center location of the radial menu towards one of the plurality of selectable menu items.

18. The non-transitory computer readable medium of claim 10, wherein the gestural input comprises swiping in an angular range encompassing one of the plurality of selectable menu items in the radial menu, wherein a starting point of the gestural input does not correspond to the center location of the radial menu.

* * * * *